United States Patent [19]

Hatakoshi et al.

[11] Patent Number: 5,377,291
[45] Date of Patent: Dec. 27, 1994

[54] WAVELENGTH CONVERTING OPTICAL DEVICE

[75] Inventors: Genichi Hatakoshi, Yokohama; Masaki Okajima, Kawasaki; Kazutaka Terashima, Ebina; Yutaka Uematsu, Yokohama, all of Japan

[73] Assignee: Kabushiki Kaisha Toshiba, Kawasaki, Japan

[21] Appl. No.: 451,234

[22] Filed: Dec. 15, 1989

[30] Foreign Application Priority Data

Jan. 13, 1989 [JP] Japan .................. 1-6224
Jul. 31, 1989 [JP] Japan .................. 1-196831

[51] Int. Cl.$^5$ .................................. G02F 1/37
[52] U.S. Cl. ...................... 385/122; 359/332; 385/37
[58] Field of Search ............ 350/96.12, 96.15, 96.16, 350/96.18, 96.19, 96.29, 432, 447, 452, 162.17; 307/425, 427, 430; 359/326, 328, 332; 385/122, 36, 37, 130

[56] References Cited

U.S. PATENT DOCUMENTS

| | | | |
|---|---|---|---|
| 4,830,447 | 5/1989 | Kamiyama et al. | 350/96.12 |
| 4,838,638 | 6/1989 | Kamiyama et al. | 350/96.19 |
| 4,874,221 | 10/1989 | Ohsawa | 350/96.29 |
| 4,892,375 | 1/1990 | Chikuma et al. | 350/96.18 |
| 4,909,587 | 3/1990 | Okamoto et al. | 350/96.19 |

FOREIGN PATENT DOCUMENTS

| | | |
|---|---|---|
| 0352751 | 1/1990 | European Pat. Off. . |
| 0372345 | 6/1990 | European Pat. Off. . |
| 61-18933 | 1/1986 | Japan . |
| 61-18934 | 1/1986 | Japan . |
| 61-189524 | 8/1986 | Japan . |
| 63-15235 | 1/1988 | Japan . |
| 63-121829 | 5/1988 | Japan . |
| 63-155432 | 6/1988 | Japan . |
| 63-254424 | 10/1988 | Japan . |
| 63-269130 | 11/1988 | Japan . |
| 63-269131 | 11/1988 | Japan . |

OTHER PUBLICATIONS

Article in the IEEE Journal of Quantum Electronics, vol. 24, No. 6, Jun. 1988, pp. 913–919; entitled "Efficient Second Harmonic Generation of a Diode-Laser . . .".
Article in the Journal of the Optical Society of America, vol. 44, No. 8, pp. 592–597; entitled "The Axicon: A New Type of Optical Element", Aug. 1954.
"Optical Integrated Circuits", Publication Date: Feb. 25, 1985, pp. 99–100 (Japanese).
Patent Abstract of Japan, vol. 9, No. 262(P-398)[1985], Oct. 19, 1985; JP-A-60 112 023 (Matsushita Denki Sangyo K.K.).
Patent Abstract of Japan, vol. 12, No. 370(P-767)[3217], Oct. 5, 1988; JP-A-63 121 829 (Matsushita Electric Ind. Co., Ltd.).

*Primary Examiner*—John D. Lee
*Attorney, Agent, or Firm*—Oblon, Spivak, McClelland, Maier, & Neustadt

[57] ABSTRACT

A wavelength converting optical device includes an optical waveguide which has a waveguide portion and a cladding portion, at least one of which is formed of a nonlinear optical material. A fundamental wave, incident on the waveguide portion from an input end face of the waveguide, is converted into an optical second harmonic wave by Cerenkov radiation and is radiated into the cladding portion. The radiated second harmonic wave is output from an output end face of the waveguide. A reflecting film is provided on the emerging end face of the waveguide. The reflecting film includes a high reflectivity with respect to the fundamental wave of a guide mode and a low reflectivity with respect to the optical second harmonic wave. A wave front converting element is arranged to oppose the reflecting film. The converting element has a diffraction grating for converting the second harmonic wave, emerging from the output end face of the waveguide, into a plane wave.

23 Claims, 15 Drawing Sheets

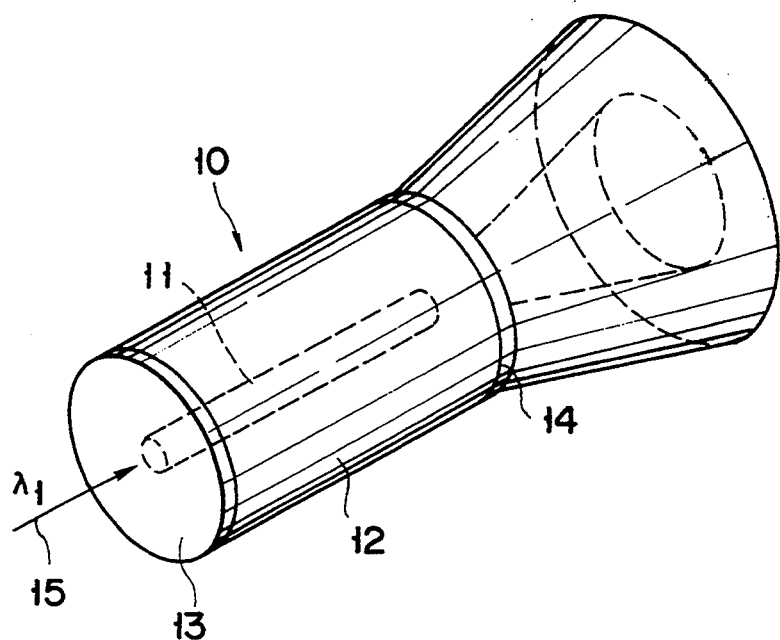
F I G. 1
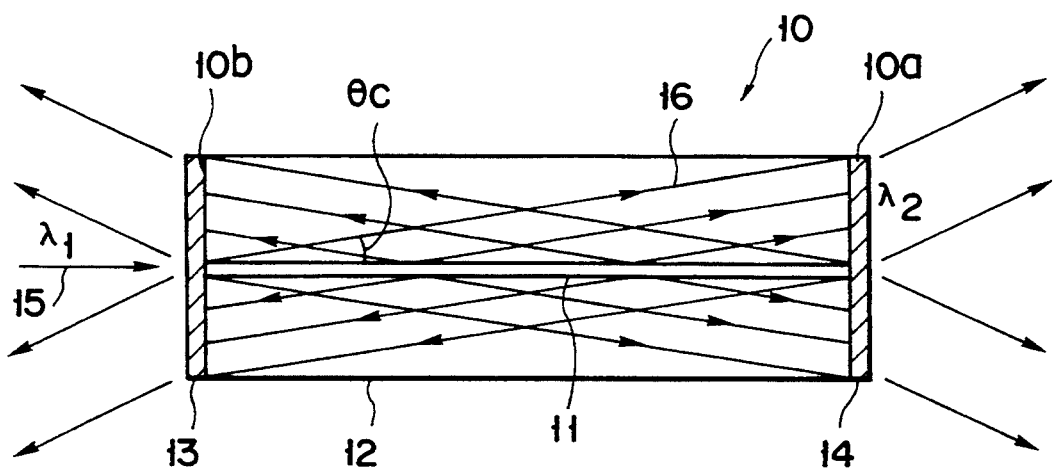
F I G. 2

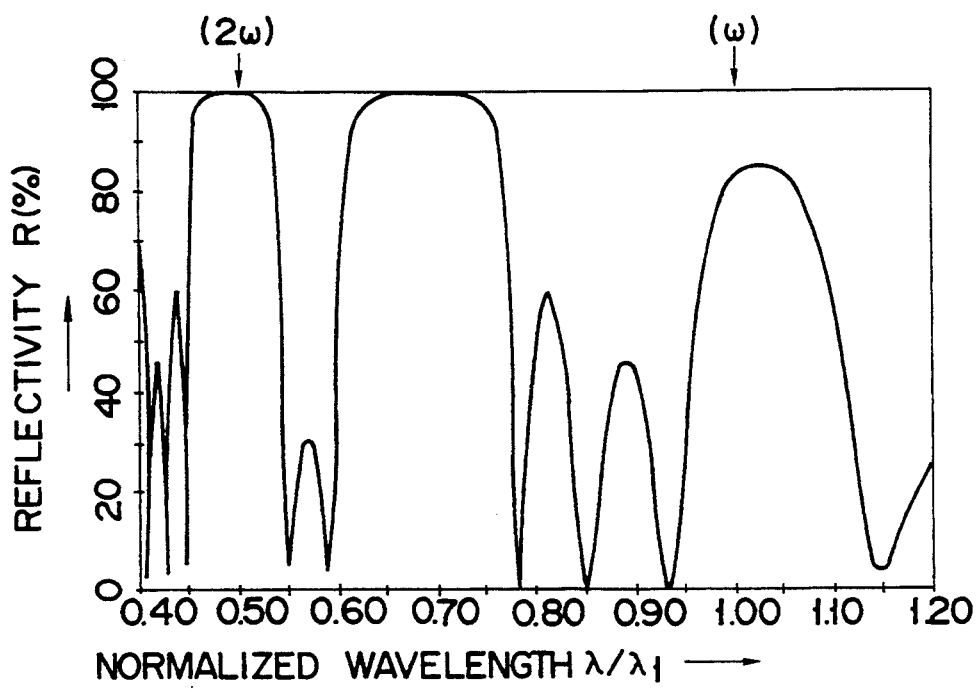
F I G. 5A
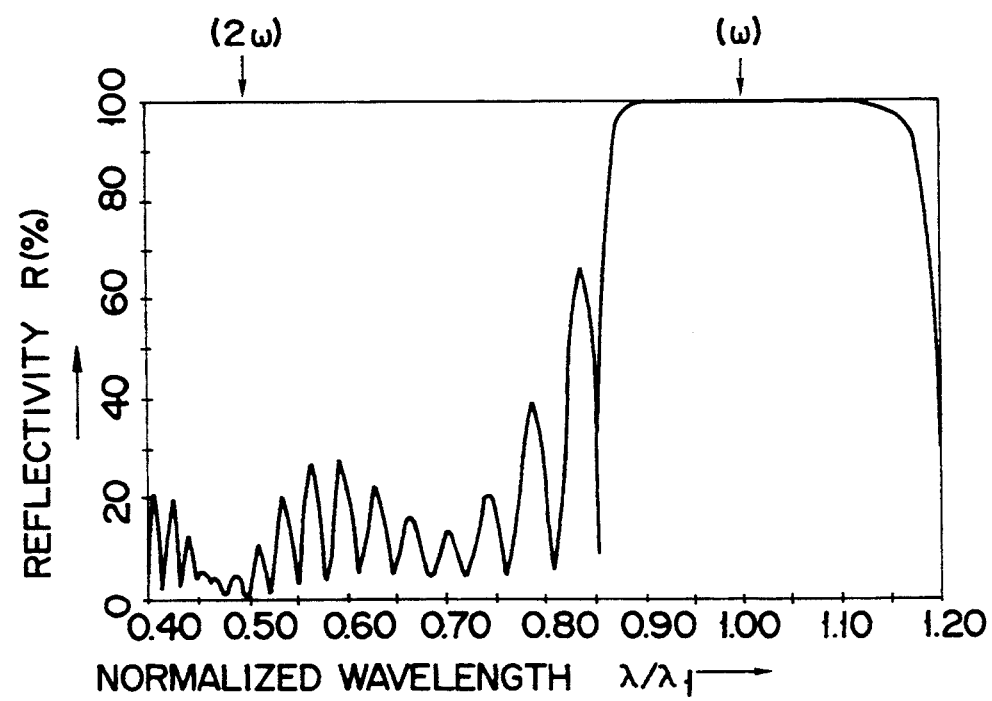
F I G. 5B

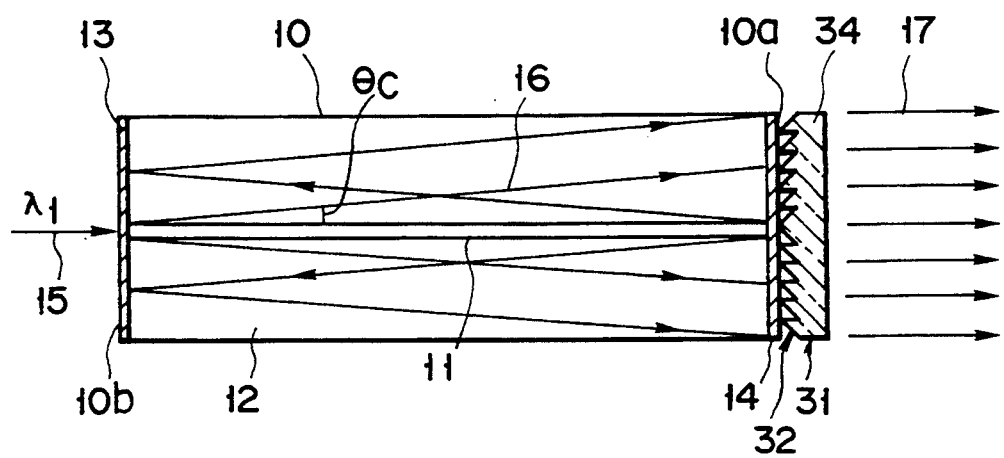
FIG. 6
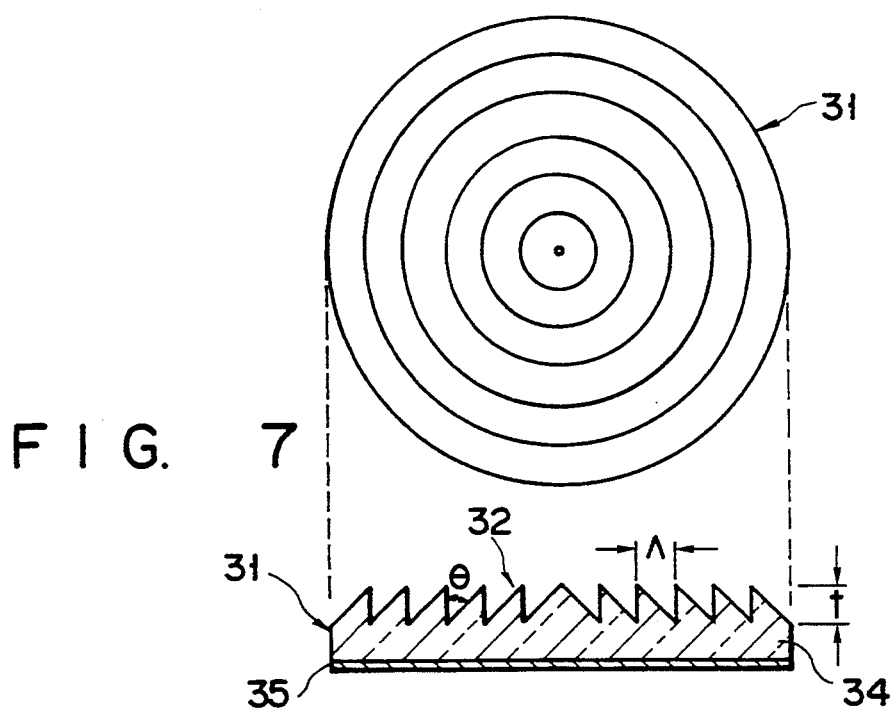
FIG. 7
FIG. 8

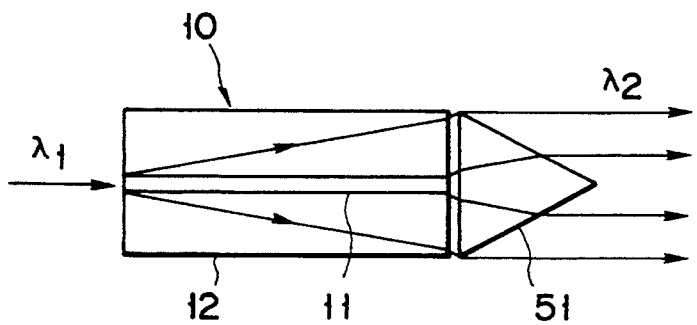 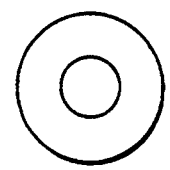
FIG. 10A    FIG. 10B
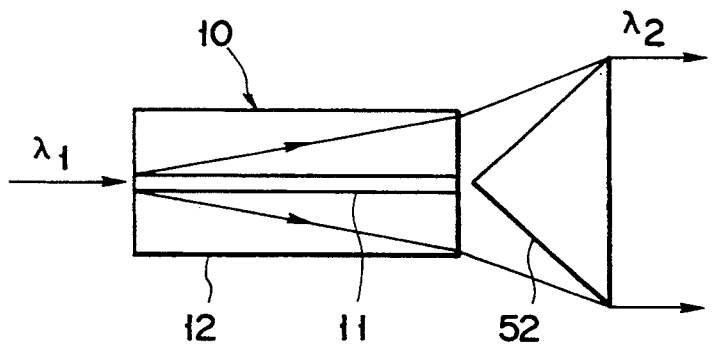 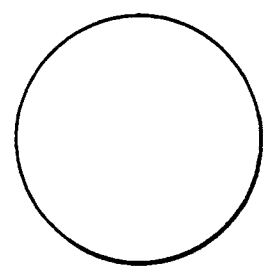
FIG. 11A    FIG. 11B
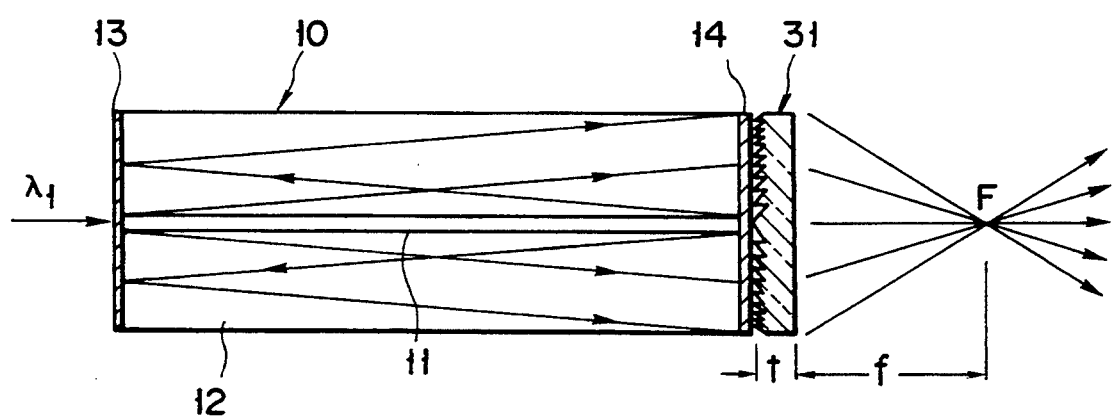
FIG. 12

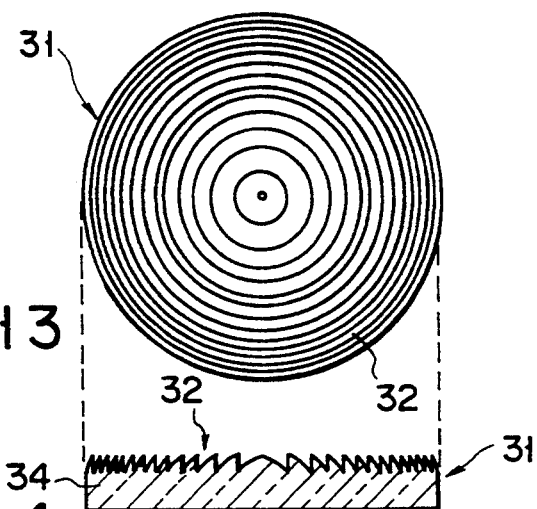
FIG. 13
FIG. 14
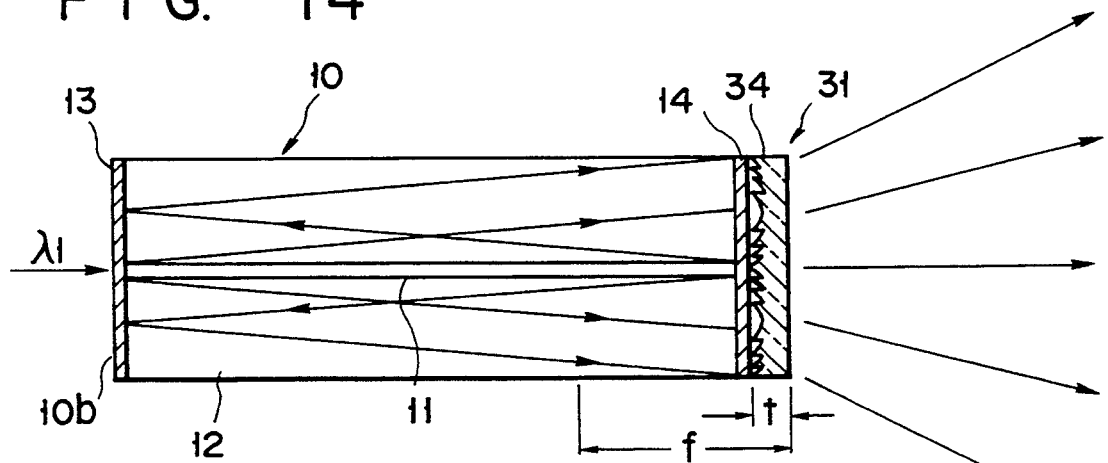
FIG. 15
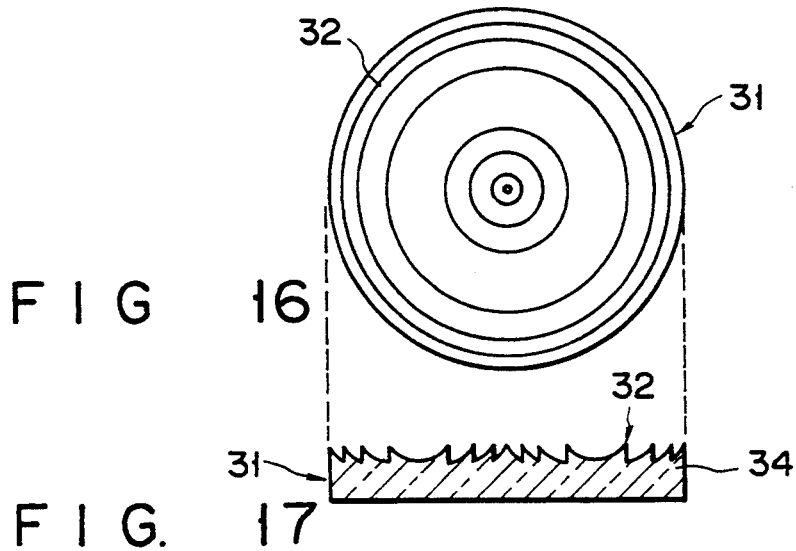
FIG. 16
FIG. 17

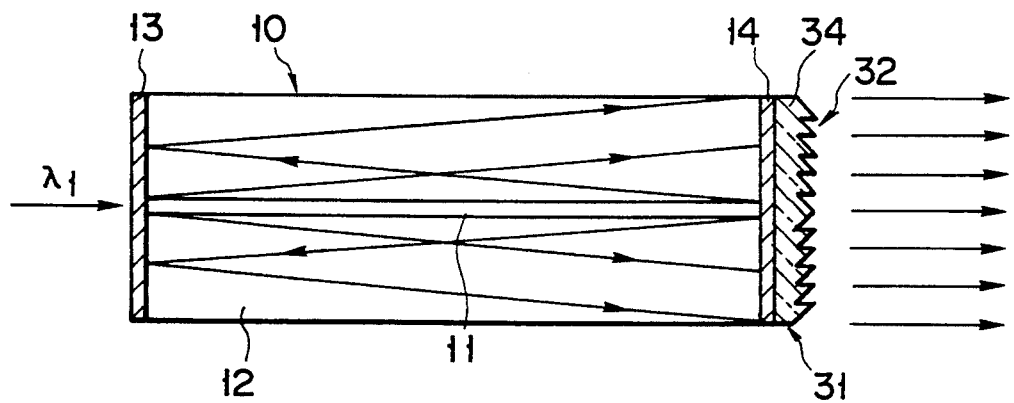
F I G. 18
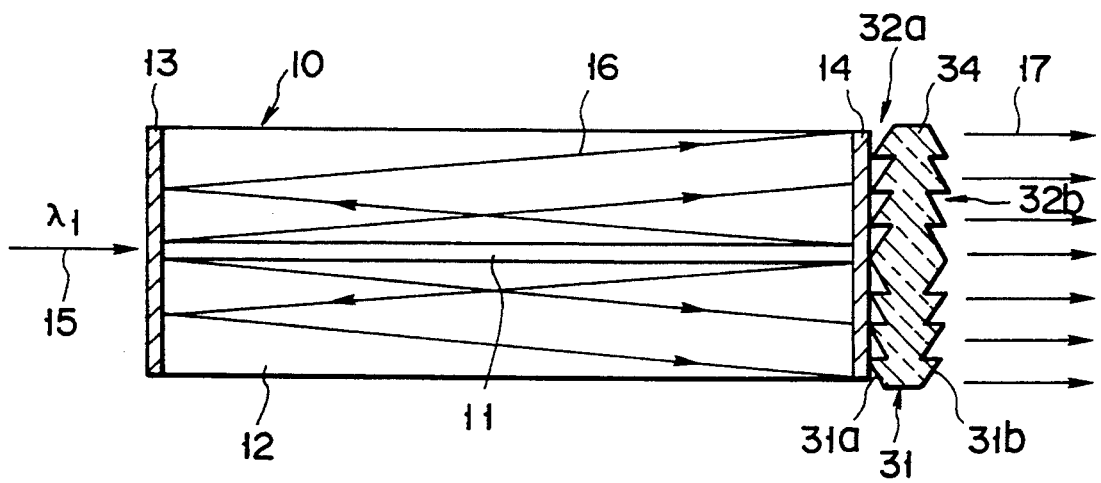
F I G. 19
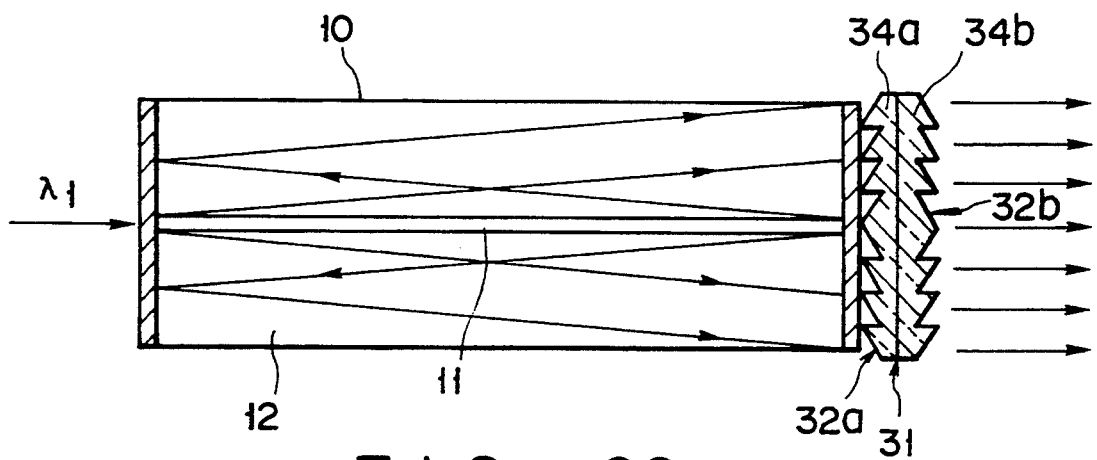
F I G. 20

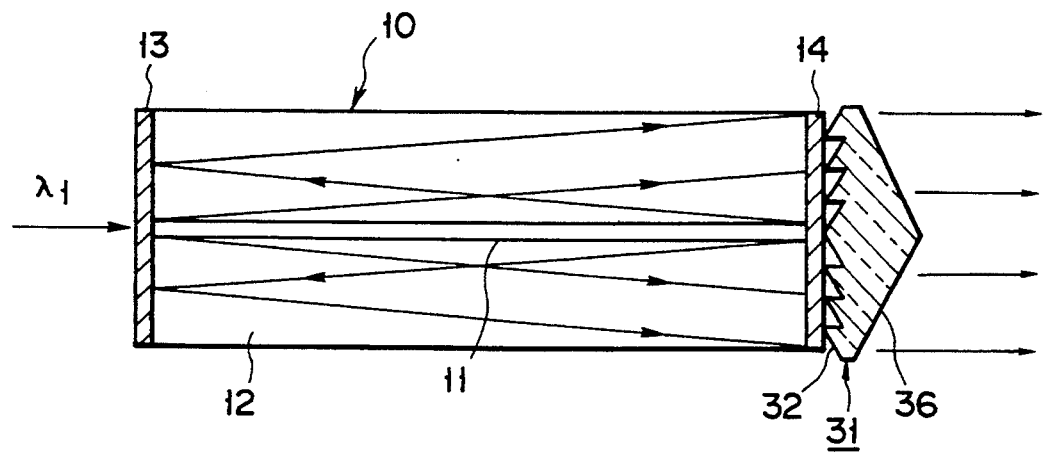
F I G. 21
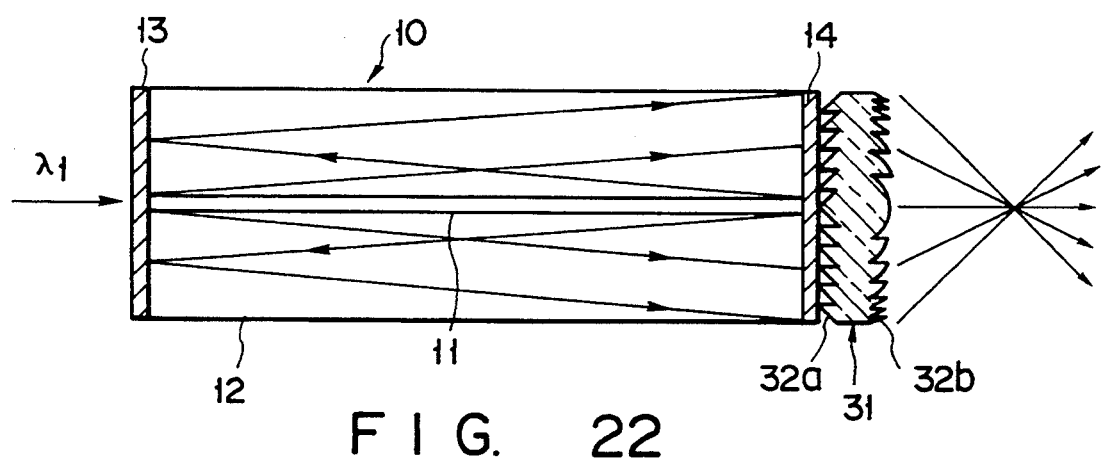
F I G. 22
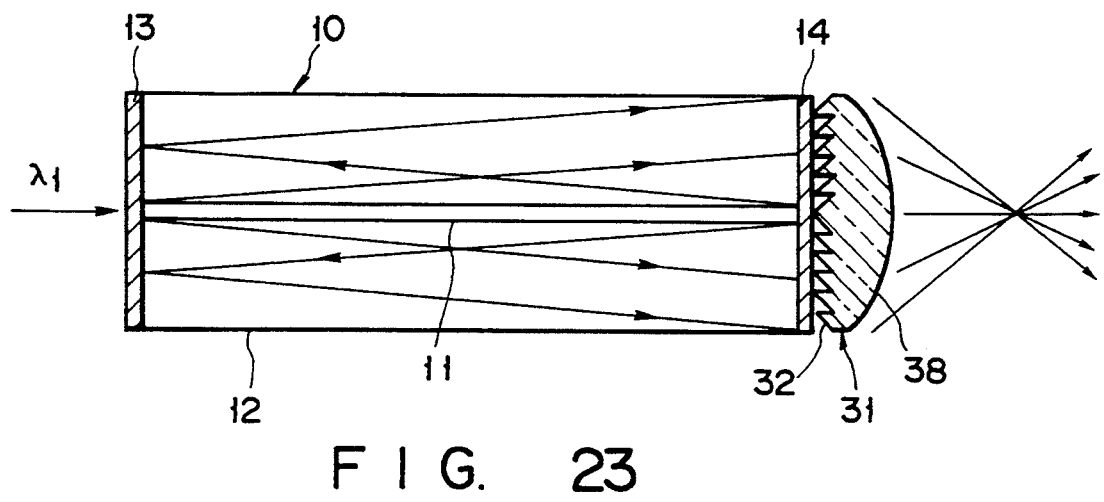
F I G. 23

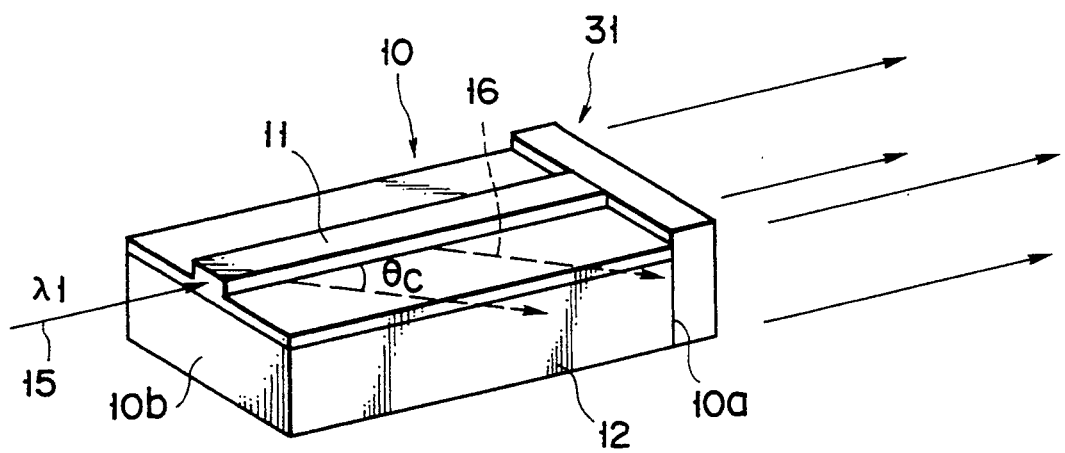
FIG. 24
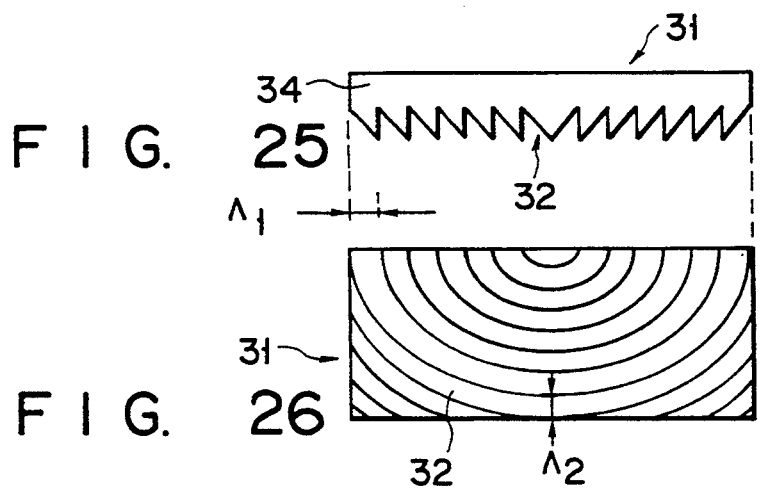
FIG. 25
FIG. 26
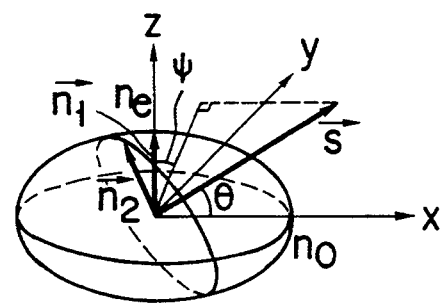
FIG. 27

WAVELENGTH CONVERTING OPTICAL DEVICE

BACKGROUND OF THE INVENTION

1. Field of the Invention

The present invention relates to a wavelength converting optical device for obtaining a light source for short wavelengths used for optical information processing or optical measurement equipments and, more particularly, to a wavelength converting optical device using a Cerenkov radiation system.

2. Description of the Related Art

Coherent light sources for short wavelengths have recently been developed for the purpose of application to high-density optical disk systems, measurement/display systems, and the like. In an optical disk system, since the spot size of a light beam focused on a disk surface is proportional to the wavelength of the light source, a short wavelength light source is indispensable to a high-density optical disk system.

A semiconductor laser as a short wavelength light source is compact and lightweight and has low power consumption. Because of these advantages, semiconductor lasers for shorter wavelengths using new materials have been developed. An InGaAlP semiconductor laser having an oscillation wavelength in the 0.6-$\mu$m band (red) has already reached the level of practical application. Although semiconductor lasers for oscillating light beams having shorter wavelengths, such as green or blue light beams, have been studied, no laser capable of continuous-wave oscillation at room temperature has been obtained yet, and hence practical application of such a laser is not warranted.

As another means for realizing a short wavelength light source, second harmonic generation (SHG) using a nonlinear optical crystal is available, and various studies on SHG have been made. Especially, in SHG, in order to realize a compact, low-power-consumption light source, an attempt has been made to form a nonlinear optical crystal into a waveguide by using a semiconductor laser as a fundamental wave light source. For example, a blue light beam ($\mu_2$) of 1 mW as a second harmonic wave was obtained with respect to a semiconductor laser beam with a fundamental wave ($\lambda_1$) of 80 mW, by using a proton-exchange LiNbO$_3$ waveguide having a waveguide portion formed on an LiNbO$_3$ substrate (T. Taniuchi et al., Extended Abstracts (The 48th Autumn Meeting, 1987); The Japan Society of Applied Physics, 19p-ZG-4). In this system, a second harmonic wave is radiated into a waveguide substrate by Cerenkov radiation. This system is advantageous over the conventional SHG system in that phase matching by angle control, temperature control, or the like is not required.

For practical applications of such a wavelength converting optical element as a short wavelength light source, a light output of at least several mW must be obtained. For this purpose, a light output of 100 mw or more is required as a fundamental wave. As the output of a semiconductor laser is increased, the laser tends to be degraded due to the influences of heat, COD (catastrophic optical damage), and the like. Therefore, a long-term reliability is difficult to ensure. This poses a serious limitation in practical use of a short wavelength light source using the SHG system.

In bulk SHG, an external cavity system is considered as a means for increasing the conversion efficiency from a fundamental wave to an optical second harmonic wave. It is reported that an optical second harmonic wave of 29.7 mW is obtained with respect to, e.g., a light output of 52.6 mW as a fundamental wave by using this system (W. J. Kozlovsky et al., IEEE J. Quantum Electron., Vol-24, No. 6, pp. 913 -919 (1988)). In this system, however, a YAG laser excited by a semiconductor laser is used as a fundamental wave, and the excitation semiconductor laser must have a light output of 500 mW. On the other hand, resonator type SHG in an optical waveguide has been reported. In this case, a conversion efficiency of 0.1% to a second harmonic wave is obtained using Ar laser light as a fundamental wave (R. Reginer et al.: ECOC'86 (1986)). However, in order to realize resonator type SHG in an optical waveguide, both resonation conditions and phase matching conditions must be satisfied. Hence, strict temperature control precision is required. This poses a serious limitation to the practical use of this system.

In an arrangement in which the above-described proton-exchange LiNbO$_3$ waveguide is used, a Cerenkov radiation beam has a complex wave front due to radiation from axially distributed light sources. More specifically, a Cerenkov radiation beam is constituted by divergent light having different beam waist positions depending on output positions and hence does not have axial symmetry for the case of LiNbO$_3$ waveguide. For this reason, in order to collimate or focus the radiation beam, a special optical system is required. In addition, it is difficult to decrease the spot size of the beam to a diffraction limit.

In contrast to this, as a system using the same Cerenkov radiation system, SHG by a single-crystal fiber made of a nonlinear material is reported (T. Yamada et al., Extended Abstracts (The 47th Autumn Meeting, 1986); The Japan Society of Applied Physics, 29a-X-2). A waveguide for this SHG has a coaxial structure in which a nonlinear crystal core is covered with a glass cladding. An optical second harmonic wave becomes Cerenkov radiation light propagating in the cladding at a predetermined angle $\theta_c$ with respect to the optical axis, and a beam emerging from a fiber end face becomes a ring-like beam diverging at an angle $\theta_0$ with respect to the optical axis ($\theta_0 = \sin^{-1}(n_2 \sin\theta_c)$, where $n_2$ is the refractive index of the cladding with respect to the optical second harmonic wave). This output beam has axial symmetry, but cannot be directly collimated or focused.

As described above, in the conventional SHG system using an optical waveguide for a compact system, a satisfactory conversion efficiency has not yet been obtained, and a light output of 100 mW or more is required as a fundamental wave. In addition, in the system using a resonator type optical waveguide for high efficiency, since strict temperature control precision is required for phase matching, its practical use is difficult.

In the SHG system using Cerenkov radiation requiring no phase matching, it is difficult to collimate or focus the output beam. Moreover, in the fiber system capable of obtaining a beam having axial symmetry, the output beam cannot be directly collimated. Even if collimation is performed by using a special optical system, strict process precision of optical elements is required.

SUMMARY OF THE INVENTION

The present invention has been made in consideration of the above situation, and has its object to provide a wavelength converting optical device having a high conversion efficiency without phase matching adjustment.

It is another object of the present invention to provide a wavelength converting optical device which can collimate or focus an optical second harmonic beam generated by Cerenkov radiation, without using a special optical system.

According to the present invention, a reflecting film is formed on an end face of an optical waveguide so as to increase conversion efficiency from a fundamental wave to an optical second harmonic wave. In addition, a wave front converting element for converting a conical wave into a plane wave or spherical wave is formed on a light output end face of an optical waveguide so as to collimate or focus an optical second harmonic beam emitted from the light output end face of the optical waveguide.

According to the present invention, there is provided a device which comprises an optical waveguide having a waveguide portion and a cladding portion at least one of which is formed of a nonlinear optical material, for converting a fundamental wave, incident on the waveguide portion from one end face of the optical waveguide, into an optical second harmonic wave by Cerenkov radiation, radiating the second harmonic wave onto the cladding portion, and outputting the optical second harmonic wave radiated on the cladding portion from the other end face of the optical waveguide; and a reflecting film formed on at least an optical second harmonic emerging end face of the optical waveguide, the reflecting film having a high reflectivity with respect to a fundamental wave of a guided mode and having a low reflectivity with respect to the optical second harmonic wave.

In addition, according to the present invention, there is provided a wavelength converting optical device for collimating or focusing an optical second harmonic wave, which comprises a wavelength converting portion, having an optical waveguide including a waveguide portion and a cladding portion, at least one of which is formed of a nonlinear optical material, for converting a fundamental wave, incident on the waveguide portion from one end face of the optical waveguide, into an optical second harmonic wave by Cerenkov radiation, radiating the optical harmonic wave onto the clad portion, and outputting the optical second harmonic wave radiated on the cladding portion from the other end face of the optical waveguide; and a wave front converting portion, provided at the other end face of the waveguide, for converting the second harmonic wave emitted from the other end face into a plane wave, a spherical wave, or a conical wave having different divergence angles.

According to the present invention, in optical waveguide type SHG using a Cerenkov radiation system, by forming the above-described reflecting film on the end face of the optical waveguide, optical power in the optical waveguide can be increased, and hence the conversion efficiency from a fundamental wave to an optical second harmonic wave can be increased.

Further, according to the present invention, since the above-described wave front converting portion is provided at the end face of the optical waveguide, an optical second harmonic wave as a plane wave (collimated light) or a spherical wave (converging or diverging light) can be obtained, thus allowing effective use of an optical second harmonic beam. Furthermore, if the optical waveguide is constituted as a fiber optical waveguide, a wavelength converting optical device comprising a wave front converting portion, which can be easily manufactured and allows easy positioning, can be realized by using a concentrical diffraction grating as the wave front converting portion provided at the light emerging end face of the waveguide. Moreover, a wavelength converting optical device comprising a wave front converting portion having a high diffraction efficiency can be realized by using a diffraction grating with a sawtooth section.

BRIEF DESCRIPTION OF THE DRAWINGS

FIGS. 1 and 2 show a wavelength converting optical device according to a first embodiment of the present invention, in which FIG. 1 is a perspective view of the device and FIG. 2 is a sectional view showing a schematic arrangement of the device;

FIGS. 4 to 5B show a wavelength converting optical device according to a second embodiment of the present invention, in which FIG. 4 is a sectional view showing a schematic arrangement of the device, FIG. 5A is a graph showing a relationship between the normalized wavelength and reflectivity of a second reflecting film, and FIG. 5B is a graph showing a relationship between the normalized wavelength and reflectivity of a first reflecting film;

FIGS. 6 to 9 show a wavelength converting optical device according to a third embodiment of the present invention, in which FIG. 6 is a sectional view showing a schematic arrangement of the device, FIG. 7 is a top view of a wave front converting element, FIG. 8 is a sectional view of the wave front converting element, and FIG. 9 is a view for explaining a method of forming the wave front converting element;

FIGS. 10A and 10B are sectional and front views, respectively, showing a first comparative example wherein a prism is used as a wave front converting element;

FIGS. 11A and 11B are sectional and front views, respectively, showing a second comparative example wherein a prism is used as a wave surface converting element;

FIGS. 12 to 14 show a wavelength converting optical device according to a fourth embodiment of the present invention, in which FIG. 12 is a sectional view showing a schematic arrangement of the device, and FIGS. 13 and 14 are top and sectional views, respectively, showing a wave front converting element;

FIGS. 15 to 17 show a wavelength converting optical device according to a fifth embodiment of the present invention, in which FIG. 15 is a sectional view showing a schematic arrangement of the device, and FIGS. 16 and 17 are front and sectional views, respectively, showing a wave front converting element;

FIG. 18 is a sectional view showing a schematic arrangement of a wavelength converting optical device according to a sixth embodiment of the present invention;

FIG. 19 is a sectional view showing a schematic arrangement of a wavelength converting optical device according to a seventh embodiment of the present invention;

FIG. 20 is a sectional view showing a schematic arrangement of a wavelength converting optical device according to an eighth embodiment of the present invention;

FIG. 21 is a sectional view showing a schematic arrangement of a wavelength converting optical device according to a ninth embodiment of the present invention;

FIG. 22 is a sectional view showing a schematic arrangement of a wavelength converting optical device according to a tenth embodiment of the present invention;

FIG. 23 is a sectional view showing a schematic arrangement of a wavelength converting optical device according to an eleventh embodiment of the present invention;

FIGS. 24 to 26 show a wavelength converting optical device according to a twelfth embodiment of the present invention, in which FIG. 24 is a perspective view showing a schematic arrangement of the device, and FIGS. 25 and 26 are plan and front views, respectively, showing a wave front converting element;

FIG. 27 is a view for explaining the refractive index of $LiNbO_3$;

FIGS. 32 to 34 show a wavelength converting optical device according to a fourteenth embodiment of the present invention, in which FIG. 32 is a sectional view showing a schematic arrangement of the device, and FIGS. 33 and 34 are plan and front views, respectively, showing a wave front converting element;

FIG. 35 and 36 show a wavelength converting optical device according to a fifteenth embodiment of the present invention, in which FIG. 35 is a sectional view showing a schematic arrangement of the device, and FIG. 36 is a graph showing a relationship between the inclination angle $\Phi$ and $\Delta N$;

FIGS. 37 and 38 show a wavelength converting optical device according to a sixteenth embodiment of the present invention, in which FIG. 37 is a sectional view showing a schematic arrangement of the device, and FIG. 38 is a graph showing a relationship between the inclination angle $\Phi$ and $\Delta N$;

FIGS. 39 and 40 show a wavelength converting optical device according to a seventeenth embodiment of the present invention, in which FIG. 39 is a sectional view showing a schematic arrangement of the device, and FIG. 40 is a graph showing a relationship between the inclination angle $\Phi$ and $\Delta N$.

DETAILED DESCRIPTION OF THE PREFERRED EMBODIMENTS

Figure 3:
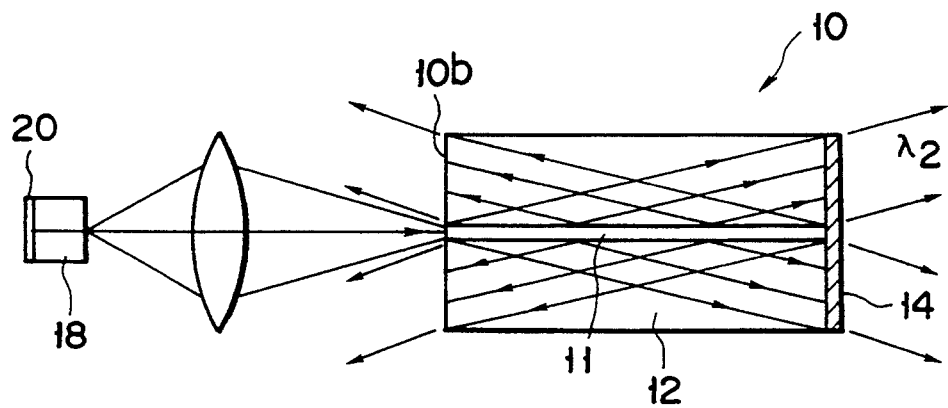
FIG. 3 is a sectional view showing a schematic arrangement of a modification of the first embodiment.

Embodiments of the present invention will be described in detail with reference to the accompanying drawings.

FIGS. 1 and 2 show a wavelength converting optical device according to a first embodiment of the present invention. The converting device comprises an optical waveguide 10 designed as a fiber type optical waveguide having axial symmetry. The waveguide 10 has a core (optical waveguide portion) 11 formed of a nonlinear material and having a circular section, and a cylindrical glass cladding 12 coated on the core 11. The waveguide 10 has output and input end faces 10a and 10b perpendicular to the axis of the waveguide. First and second reflecting films 14 and 13 are respectively bonded to these end faces. A fundamental wave 15 enters from the input end face 10b into the core 11 through the reflecting film 13, and a Cerenkov radiation beam (optical second harmonic wave) 16 propagating in the cladding 12 emerges from the output end face 10a on which the reflecting film 14 is formed.

The refractive indices of the core 11 and the cladding 12 are set so as to cause an incident fundamental wave 12 and a second harmonic wave to become a guided mode and a Cerenkov radiation beam, respectively. In this case, if the refractive indices of the cladding 12 with respect to wavelengths $\lambda_1$ and $\lambda_2 (=\lambda_1/2)$ of the fundamental wave 15 and the optical second harmonic wave 16 are respectively set to be $n_1$ and $n_2$, a material for the cladding 12 is selected to satisfy $$n_1 < n_{EFF} < n_2 \tag{1}$$

where $n_{EFF}$ is the effective refractive index of the fiber type optical waveguide 10 having the core 11 and the cladding 12 with respect to the fundamental wave.

When the fundamental wave 15 having the wavelength $\lambda_1$ is incident on the optical waveguide 10, the wave is converted into an optical second harmonic wave having a wavelength $\lambda_1/2$ by the core 11 formed of a nonlinear optical material, and propagates in the cladding 12 as the Cerenkov radiation beam 16 having an angle $\theta_c$ with respect to the core 11. The values $\theta_c$, $n_{EFF}$, and $n_2$ satisfy the following relation:

$$n_2 \cdot \cos \theta_c = n_{EFF} \tag{2}$$

The first and second reflecting films 14 and 13 serve to reflect a guided mode which is not converted into a second harmonic wave and to cause it to resonate, as will be described later. That is, the converting device is designed as a resonator type converting device.

The first reflecting film 14 is designed to have a high reflectivity with respect to a fundamental wave as a guided mode and have a low reflectivity with respect to an optical second harmonic wave as a Cerenkov radiation beam. The reflectivity of the reflecting film 14 is ideally set to be 100% with respect to a fundamental wave, but is preferably set to be 95% or more, or still more preferably, 99% or more. The reflectivity with respect to a second harmonic wave is ideally set to be 0%, but is preferably set at 5% or less, or more preferably 2% of less. On the other hand, the second reflecting film 13 is designed to have an optimal reflectivity as a resonator with respect to a fundamental wave as a guided mode, as will be described below.

Assume that the reflectivities of the reflecting films 13 and 14 with respect to a fundamental wave (guided mode) are respectively $r_1$ and $r_2$; the power of an incident fundamental wave, $P_1$; the coupling efficiency with respect to the optical waveguide 10, $\eta$; the power of the guided mode immediately after it is incident on the optical waveguide, $P_c$; the conversion efficiency to a Cerenkov radiation beam, $\gamma_{SH} \cdot P_c$; a ratio of power (with respect to a waveguide length L) lost by guided mode loss other than the conversion, a; and a power to be externally output as an optical second harmonic wave, $P_2$. In a conventional system for second harmonic generation by means of Cerenkov radiation, i.e., a system without the reflecting films 13 and 14, if reflection by the end faces of a waveguide is ignored, the following relations are established between the above parameters:

$$P_c = \eta P_1 \qquad (3)$$

$$P_2 = \gamma_{SH} \cdot P_c^2 = \eta^2 \gamma_{SH} P_1^2 \qquad (4)$$

In contrast to this, in the system with the reflecting films 13 and 14 as shown in FIG. 1, $P_c$ and $P_2$ are given by the following equations under resonance conditions (IEEE. J. Quantum Electron, QE-24,6, pp. 913-919 (1988)):

$$P_c = \frac{\eta(1 - r_1)P_1}{(1 - \sqrt{r_1 \cdot r_2} \cdot t)^2} \qquad (5)$$

$$P_2 = t_2 \cdot \gamma_{SH} P_c^2 \qquad (6)$$

where $t_2$ is the transmittance of the first reflecting film 14 with respect to an optical second harmonic wave, and t is a function of $P_c$, which is given by the following equation:

$$t = (1-a)(1-\gamma_{SH}P_c) \qquad (7)$$

In addition, the impedance matching condition of the resonator with respect to an incident wave is given as:

$$r_1 = r_2 \cdot t^2 \qquad (8)$$

If the second reflecting film 13 has a reflectivity set in the above-described manner, a guided mode which is reflected by the first reflecting film 14 without being converted into a second harmonic wave is reflected by the second reflecting film 13 and propagates toward the output end face 10a through the core 11 again. In this case, part of the guided mode is converted into a second harmonic wave and emerges from the output end face 10a.

Example 1 will be considered, in which $\eta = 0.5$, $\gamma_{SH} = 0.4/W$, $P_1 = 100$ mW, L=5 mm, and a waveguide loss $\alpha = 1$ dB/cm (a to 0.1). When no reflecting film is present, an output of 1 mW is obtained as an optical second harmonic output with the parameters according to equation (4). In contrast to this, if the reflecting films are present, and $r_2 = 1$, the reflectivity of the second reflecting film 13, which satisfies the impedance matching condition, is given as $r_1 = 0.7$ according to equations (5), (7), and (8). If $t_2 = 1$, the light output of an optical second harmonic wave is 11.4 mw. Therefore, the optical second harmonic wave power obtained in this arrangement is ten times that of the arrangement without reflecting films. Note that the reflectivity of each reflecting film can be set in the above-described manner by using a dielectric multilayer.

In example 1, a conversion efficiency of about 10% is obtained; 90% of the incident wave power is not converted into a second harmonic wave propagating toward the end face 10a. Of the incident wave power of 100 mW, 50% is not coupled to the optical waveguide, 30% is lost by waveguide loss, and 10% is converted into an optical second harmonic wave propagating in the opposite direction. As the coupling efficiency with respect to the optical waveguide is increased and the waveguide loss is decreased, a wavelength converting optical device having a higher conversion efficiency can be realized. In order to decrease the waveguide loss, the loss per unit length may be decreased, or the waveguide length may be shortened. In the above-described example, for example, a decrease in waveguide loss to 0.5 dB/cm is equivalent to a decrease in waveguide length to 2.5 mm in terms of an increase in conversion efficiency. In this case, the impedance matching condition is given as $r_1 = 0.75$, and, at this time, an optical second harmonic wave power of 16.4 mw is obtained.

Since a high conversion efficiency can be obtained in the resonator type SHG system, the power of an incident wave can be set to be a smaller value when $\alpha \cdot L = 0.25$ dB and an incident wave power is set to be 30 mW, an impedance matching condition is given as $r_1 = 0.83$, and an optical second harmonic wave power is 3.1 mW. That is, even if the fundamental wave power is set to be 30 mW and the coupling efficiency with respect to the optical waveguide is 50%, a conversion efficiency of 10% can be obtained. A light output of 30 mw is a general value for a GaAAs laser used as a light source for a write-once type disk, and hence such an SHG system can be realized.

As described above, in the first embodiment, since the reflecting films 13 and 14 are provided on both the end faces of the fiber type optical waveguide to form a resonator, a guided mode power in the optical waveguide 10 can be increased. For this reason, the fundamental wave can be effectively converted into a Cerenkov radiation beam in the optical waveguide 10, and a conversion efficiency can be greatly increased to about ten times that of a conventional system. Since it is possible to decrease the incidence power, the device of this embodiment can be effectively used as a short wavelength light source having a light output of several mW even by using a currently available semiconductor laser. In addition, the device can be realized with a very simple arrangement obtained by merely providing the reflecting films 13 and 14 on both end faces of the optical waveguide 10.

In this embodiment, a resonator is formed by providing the reflecting films on both end faces of the optical waveguide. However, the conversion efficiency can be increased by providing a reflecting film on only the output end face. For example, as shown in FIG. 3, a semiconductor laser 18 is used as a light source for generating a fundamental wave, and a resonance effect may be obtained between the first reflecting film 14 of the converting device and a reflecting film 20 of the semiconductor laser.

Figure 4:
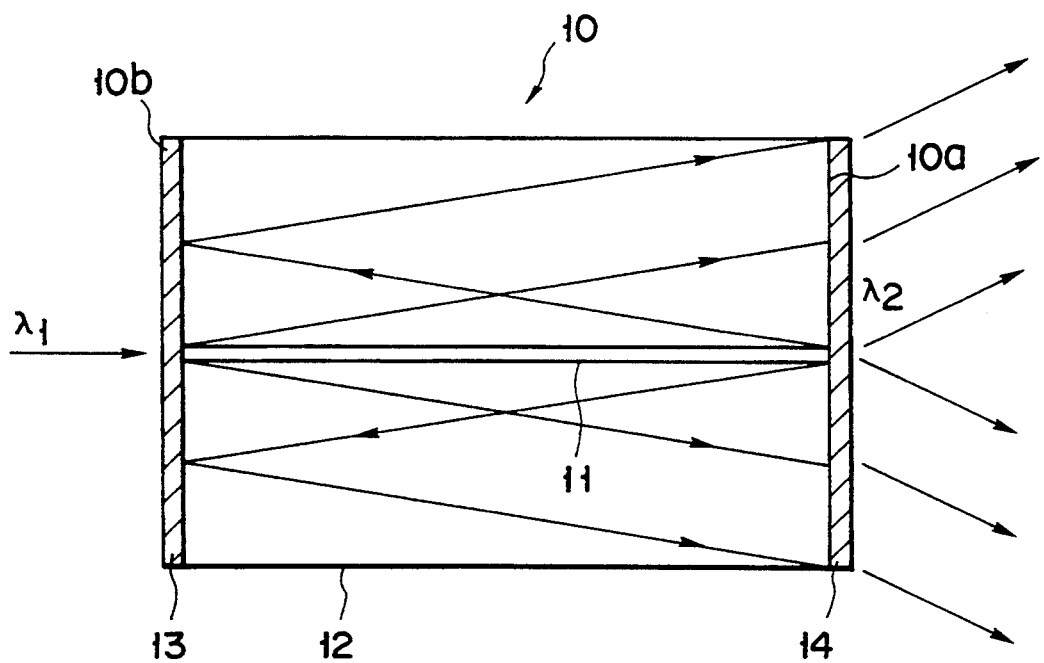

FIG. 4 shows a wavelength converting optical device according to the second embodiment of the present invention. In this embodiment, the same parts as in the first embodiment are represented by the same reference numerals, and a detailed description thereof will be omitted. The second embodiment is equivalent to the first embodiment in terms of its structure, but is different therefrom in the function of the second reflecting film 13. More specifically, in the first embodiment, half of an optical second harmonic wave generated by Cerenkov radiation propagates to the input end face 10b of the waveguide 10 and is wasted. In contrast to this, in the second embodiment, the optical second harmonic wave propagating to the incidence end face side is reflected by the reflecting film 13 so as to cause the wave to propagate toward the end face 10a of the waveguide 10.

According to such an arrangement, an output twice that of the first embodiment, e.g., an optical second harmonic wave output of 6 mW or more can be obtained with respect to a fundamental wave of 30 mW. In this case, the reflectivity of the second reflecting film 13 with respect to a fundamental wave as a guided mode may be set to be the same value as that of the first embodiment, and the reflectivity with respect to an optical second harmonic wave as a Cerenkov radiation beam may be set to be 100%. In this case, the respective ideal values can be summarized as follows:

$$\left. \begin{array}{ll} r_1(\omega) = 0.83, & r_1(2\omega) = 1 \\ r_2(\omega) = 1, & r_2(2\omega) = 0 \end{array} \right\} \quad (9)$$

where $(\omega)$ and $(2\omega)$ are respectively the reflectivities with respect to a fundamental wave and an optical second harmonic wave. The reflectivity of the second reflecting film 13 with respect to a fundamental wave is preferably set within the range of 50 to 95%. The following Table shows the design of each reflecting film (dielectric multilayer) for the above specification.

TABLE

| (a) Structure of Reflecting Film 13 (Center wavelength $\lambda_0 = 0.57$) | | (b) Structure of Reflecting Film 14 (Center wavelength $\lambda_0 = 1.0$) | |
|---|---|---|---|
| Layer Number | Layer Composition | Layer Number | Layer Composition |
| 1 | L | 1 | 1.24L |
| 2 | H | 2 | H |
| 3 | 2L | 3 | 1.08L |
| 4 | H | 4 | 0.92H |
| 5 | L | 5 | L |
| 6 | H | 6 | H |
| 7 | L | 7 | L |
| 8 | H | 8 | H |
| 9 | 2L | 9 | L |
| 10 | H | 10 | H |
| 11 | L | 11 | L |
| 12 | H | 12 | H |
| 13 | L | 13 | L |
| 14 | H | 14 | H |
| 15 | 2L | 15 | L |
| 16 | H | 16 | H |
| 17 | L | 17 | L |
| 18 | H | 18 | H |
| 19 | L | 19 | L |
| 20 | H | 20 | 0.92H |
| 21 | 2L | 21 | 1.08L |
| 22 | H | 22 | H |
| 23 | L | 23 | 1.24L |

In this Table, a center wavelength $\lambda_0$ is a value normalized by the wavelength of a fundamental wave, and H and L respectively represent high- and low-refractive-index layers having an optical thickness of $\lambda_0/4$. Actual thicknesses $t_H$ and $t_L$ of these layers are given by the following equations:

$$t_H = (\lambda_0/4)/(n_H \cos \theta_H)$$

$$t_L = (\lambda_0/4)/(n_L \cos \theta_L) \quad (10)$$

where $n_H$ and $n_L$ are the refractive indices of the respective layers, and the following relationship is established between $\theta_H$ and $\theta_L$ and a Cerenkov radiation angle $\theta_c$.

$$n_2 \sin \theta_c = n_H \sin \theta_H = n_L \sin \theta_L \quad (11)$$

The dielectric multilayers shown in Table respectively have a bandpass filter and a short-wavelength-pass filter as their fundamental structures. FIGS. 5A and 5B respectively show wavelength characteristics of these dielectric multilayers when $n_H = 2.3(TiO_2)$ and $n_L = 1.46$ ($SiO_2$). FIGS. 5A and 5B respectively correspond to the dielectric multilayers denoted by (a) and (b) in Table. In FIGS. 5A and 5B, values normalized by a wavelength $\lambda_1$ of a fundamental wave are plotted along each abscissa axis. Wavelengths $\lambda/\lambda_1 = 1$ and $\lambda/\lambda_1 = 0.5$ respectively correspond to a fundamental wave ($\omega$) and an optical second harmonic wave ($2\omega$). The actual reflectivities of the dielectric multilayers for the specification represented by equation (9) are:

$$\left. \begin{array}{l} r_1(\omega) = 0.8321 \\ r_1(\omega 2) = 0.9959 \\ r_2(\omega) = 0.9998 \\ r_2(2\omega) = 0.0033 \end{array} \right\} \quad (12)$$

As is apparent from a comparison between equations (9) and (12), the multilayers can be designed to substantially satisfy the reflectivity characteristics of the specification. In this case, calculations are performed assuming that the value $\theta_c$ is small and a second harmonic wave is perpendicularly incident on the first and second reflecting films. However, reflectivity design can be performed in consideration of incidence angles and the difference in reflectivity between a radiation mode (optical second harmonic wave) and a guided mode (fundamental wave).

In the embodiments described with reference to FIGS. 1 and 4, a structure having axial symmetry (fiber type optical waveguide) is exemplified. However, as an optical waveguide, a diffusion type optical waveguide or a three-dimensional optical waveguide such as a ridge stripe type optical waveguide may be used.

In addition, in the first and second embodiments, an optical second harmonic wave to be output from the end face of the optical waveguide is a conical wave, and hence cannot be directly collimated or focused. However, if an optical element (wave front converting element) to be described later is used, the second harmonic wave can be converted into a plane or spherical wave.

FIGS. 6 to 8 show a third embodiment of the present invention. The same reference numerals in the third embodiment denote the same parts as in the second embodiment, and a detailed description thereof will be omitted.

A wavelength converting optical device comprises a fiber type optical waveguide (wavelength converting portion) 10 which has a core (waveguide portion) 11 formed of a nonlinear material and covered with a glass cladding 12. First and second reflecting films 14 and 13 are respectively attached to output and input end faces 10a and 10b of the waveguide 10. In addition, according to the third embodiment, a lens plate (wave front converting portion) 31 having a diffraction grating of a concentrical pattern serving as a wave front converting element is arranged in contact with the first reflecting film 14. Refractive indices $n_1$ and $n_2$ of the cladding 12 and an effective refractive index $n_{EFF}$ of the optical waveguide 10 with respect to a fundamental wave are selected to satisfy equation (1) described above. A radiation angle $\theta_c$ of a Cerenkov radiation beam 16 with respect to the core 11 is given by equation (2). The first and second reflecting films 14 and 13 are designed in the same manner as in the second embodiment.

In this embodiment, the optical second harmonic wave 16 emerging from the optical waveguide 10 is converted into a parallel light beam 17 by the lens plate 31. This parallel light beam 17 can be focused into a diffraction-limited spot by a conventional convex lens, unlike a light beam diverging in the form of a ring.

The lens plate 31 includes a concentric diffraction grating 32 having grooves formed at equal intervals. A grating pitch $\Lambda$ of the diffraction grating 32 is set to satisfy $$\Lambda = m\lambda_2/(n_2 \sin\theta_c) \quad (13)$$

where m is a positive integer. In this case, an optical second harmonic wave 16 emerging from the end face of the fiber type optical waveguide 10 is converted into a collimated light beam 17 by m-th order diffraction of the diffraction grating 32 of the lens plate 31. FIGS. 7 and 8 show a structure of the diffraction grating 32. In this case, the lens plate 31 includes a disk-like substrate 34. The diffraction grating 32 is formed on the incidence surface of the substrate. An anti-reflecting coating film 35 for preventing reflection of a harmonic wave in the substrate is bonded to the emerging surface of the diffraction grating 32. The lens plate 31 is arranged such that the center of diffraction grating 32 coincides with the central axis of the waveguide 10. In order to obtain a high diffraction efficiency, the diffraction grating 32 has a sawtooth sectional shape, as shown in FIG. 8. An inclination angle $\theta$ of each tooth at the sawtooth diffraction grating section is set to satisfy the following equation:

$$\tan\theta = (n_s - \cos\theta_0)/\sin\theta_0 \quad (14)$$

where $n_s$ is the refractive index of the substrate 34, and $\theta_0$ is the propagation angle of a second harmonic wave emerging from the output end face 10a of the optical waveguide 10 in air. The following relationship is established between the propagation angle $\theta_0$ and the radiation angle $\theta_c$ by Cerenkov radiation:

$$n_2 \sin\theta_c = \sin\theta_0 \quad (15)$$

A depth t of each groove of the diffraction grating 32 can be given by the following equation according to equations (14) and (15):

$$t = \frac{\Lambda n_2 \sin\theta_c}{n_s - \sqrt{1 - n_2^2 \sin^2\theta_c}} \quad (16)$$

Since the diffraction grating 32 shown in FIG. 7 has a concentric pattern, the grating 32 can be easily formed by using, e.g., a computer-controlled lathe (NC lathe). Alternatively, a metal die may be formed by means of NC lathe, and the grating 32 can be copied by using a plastic replica technique. As is apparent from equation (2), the value $\theta_c$ can be decreased by properly selecting a cladding material. For this reason, even if primary order diffraction (a grating pitch becomes the minimum value) for obtaining a high diffraction efficiency is used, since the grating pitch $\Lambda$ can be set to be relatively large, a wave front converting element can be realized with satisfactorily high precision even by machining using, e.g., an NC lathe.

According to the third embodiment having the above-described arrangement, the conversion efficiency from a fundamental wave into a second harmonic wave can be increased in the same manner as in the second embodiment, and moreover the second harmonic wave can be collimated and output. Therefore, the converting device according to the third embodiment is very effective as a short wavelength light source using a semiconductor laser.

Figure 9:
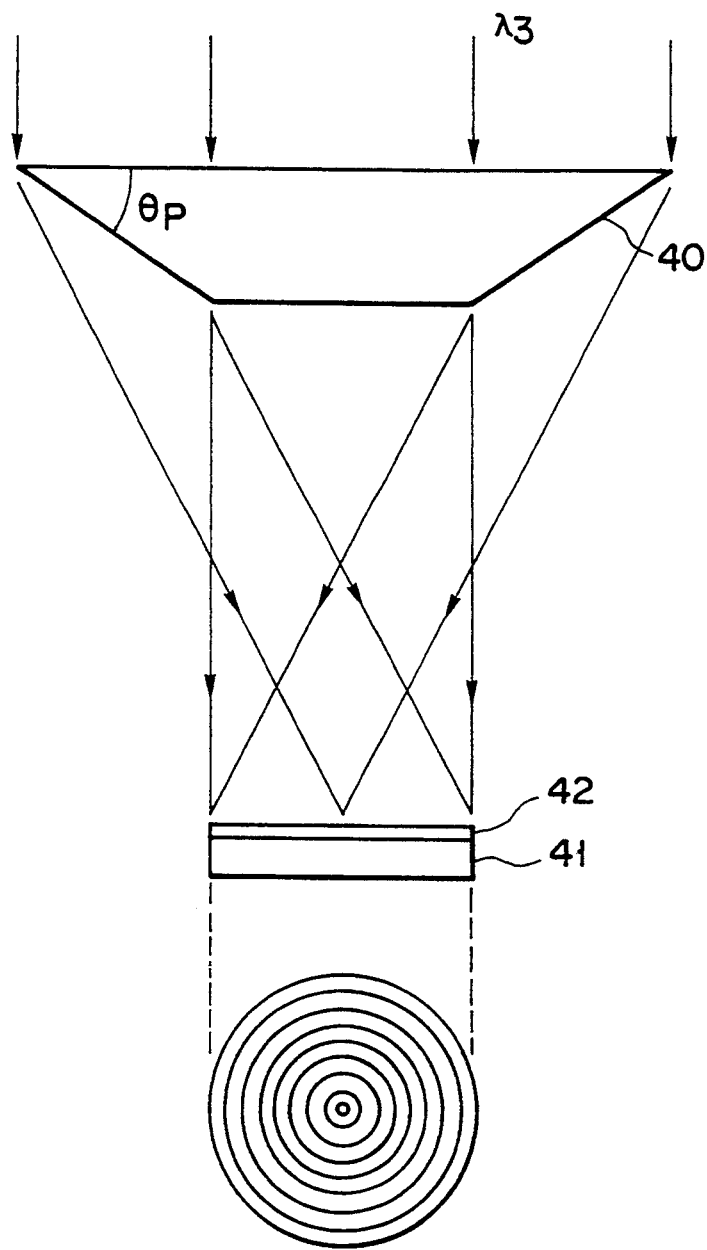

FIG. 9 shows another method of manufacturing a concentric diffraction grating by using holographic interference exposure. Referring to FIG. 9, reference numeral 40 denotes a truncated cone prism; 41, a diffraction grating substrate; and 42, a photosensitive emulsion layer. In this method, a central part of a plane wave incident on the bottom surface of the prism 40 propagates straight, whereas a peripheral part of the plane wave is refracted by a prism side surface to become a conical wave. Both the parts of light reach a surface of the emulsion layer 42, and a concentric diffraction grating is recorded on the surface by holographic interference. If the wavelength of an incident wave at the time of recording is $\lambda_3$, and the refractive index of the prism 40 is $n_p$, in order to obtain the wave front converting element 31 having the structure shown in FIGS. 7 and 8, a bottom angle $\theta_P$ of the prism 40 may be selected as follows:

$$\tan\theta_P = \frac{\lambda_3/\Lambda}{n_p - \sqrt{1 - (\lambda_3/\Lambda)^2}} \quad (17)$$

If a "thick hologram" is recorded by using a relatively thick emulsion layer, a wave front converting element having a high diffraction efficiency can be obtained. In addition, if the wavelength $\lambda_3$ of an incident wave at the time of recording is set to be equal to the wavelength $\lambda_2$, and primary order diffraction (m = 1) is used, a diffraction efficiency of nearly 100% can be obtained. In this case, the bottom angle $\theta_P$ can be given by the following equation according to equation (13):

$$\tan\theta_P = \frac{n_2 \sin\theta_c}{n_p - \sqrt{1 - n_2^2 \sin^2\theta_c}} \quad (18)$$

In this embodiment, the lens plate 31, which is an optical element called an axicon, is used. Alternatively, a conical wave can be converted into a plane wave by using another typical axicon such as a conical prism. For example, a ring-like beam can be converted into a plane wave by a conical prism 51 as shown in FIG. 10A. In this method, however, even if the bottom surface of the prism 51 is brought into tight contact with the emerging end face of the fiber type optical waveguide 10, light diverging in the form of a ring is collimated. For this reason, the collimated light still has a ring-like shape, as shown in FIG. 10B. As a countermeasure against this phenomenon, a method of arranging a conical prism 52 in the direction opposite to that in FIG. 10A as shown in FIG. 11A may be considered. In this case, as shown in FIG. 11B, a collimated beam is not a beam having a hollow central portion. However, since only one point of the prism 52 is brought into contact with the output end face of the optical waveguide 10, positioning becomes difficult. Furthermore, in either of the cases described with reference to FIGS. 10A and 11A, since the direction of light refracted by a side surface of the conical prism is determined by the bottom angle of the prism, considerably strict prism process precision is required.

In contrast to this, according to the third embodiment, since a wave front converting element constituted by a concentric diffraction grating can be attached in tight contact with the fiber type optical waveguide 10, output light does not become a ring-like beam having a hollow central portion as shown in FIG. 10B, and the difficulty in positioning shown in FIG. 11A can be eliminated.

FIGS. 12 to 14 show a schematic arrangement of a fourth embodiment of the present invention. According to this embodiment, a lens plate (wave front converting element) 31 is designed to focus an optical second harmonic wave emerging from the output end face of a fiber type optical waveguide 10 on one point. A phase $\Omega$ of a diffraction grating 32 of the element 31 is represented by the following equation as a function of a distance r from the center:

$$\Omega(r) = (2\pi/\lambda_2)\{L(r) - L_0 + r \sin \theta_0\} \quad (19)$$

where $L(r)$ is the optical path length from a point on the diffraction grating surface to a focal point F. The optical path length $L(r)$ is given by using a thickness t and a refractive index $n_s$ of a substrate 34 of the wave surface converting element 31 as follows (Appl. Opt., 24, 4307 (1985)):

$$L(r) = \sec\psi\{f + n_s^2 t/\sqrt{(n_s^2 - 1)\sec^2\psi + 1}\,\} \quad (20)$$

where $\Psi$ and r have the following relationship:

$$r = \tan\psi\{f + t/\sqrt{(n_s^2 - 1)\tan^2\psi + n_s^2}\,\} \quad (21)$$

The value r satisfying $\Omega = 2n\pi$, i.e., an n-th grating line radius from the center is obtained by solving equations (19) and (20) for $\Psi$ and substituting the obtained value into equation (21). If $L(r)$ is eliminated from equations (19) and (20), a quartic equation for $\sec\Psi$ is obtained. Therefore, the above equations can be analytically solved. In addition, a grating pitch $\Lambda(r)$ $\{=2m\pi/(d\Omega/dr)$, where m is the diffraction order to be used$\}$ at the distance r from the center can be given by the following equation:

$$\Lambda(r) = m\lambda_2/(\sin \theta_0 + \sin \Psi) \quad (22)$$

where $\Psi$ is given as a function of the value r by solving equation (21) for $\tan\Psi$. Since equation (21) is a quartic equation for $\tan\Psi$, equation (21) can be analytically solved. If a diffraction grating pattern is formed on the emergence surface side of a substrate, t=0 may be set in equations (19) to (22). In this case, an n-th grating radius $r_n$ is represented by the following equation (in primary order diffraction (m=1)):

$$r_n = \{(n\lambda_2)^2 + 2nf\lambda_2 + (n\lambda_2 + f)^2 \tan^2\theta_0\}^{\frac{1}{2}} - (n\lambda_2 + f) \tan \theta_0 \quad (23)$$

If $\theta_0 = 0$ in the above equation, it represents a socalled Fresnel zone plate. If $f = \infty$, $$r_n = n\lambda_2/\tan \theta_0 \quad (24)$$

This equation represents the grating line radius of the wave front converting element 31 shown in FIG. 7.

In addition, if f in equations (19) to (23) is substituted by −f, the resultant equations represent a wave front converting element for converting radiated light into light diverging from a point separated from the emerging surface of the substrate 34 by the distance f. FIGS. 15 to 17 show an embodiment in which this wave front converting element is used.

FIGS. 13 and 14 and FIGS. 16 and 17 respectively show patterns of diffraction gratings 32 of the wave front converting elements 31 according to the fourth and fifth embodiments. As is apparent from these drawings, in either of the embodiments, since a concentric pattern is employed, a diffraction grating can be formed by machining using an NC lathe in the same manner as in the third embodiment.

In the third to fifth embodiments, the diffraction grating 32 is formed on the incidence surface side of the wave surface converting element 31. However, if the thickness of a substrate 34 which forms a wave front converting element is sufficiently small, a diffraction grating may be formed on the emerging surface side of the substrate. FIG. 18 shows the sixth embodiment of the present invention, in which a diffraction grating 32 having a concentric pattern is formed on the light emerging side of a substrate 34 of a wave front converting element 31. In this case, the flat bottom surface of the substrate 34 can be bonded to the emerging end face of a fiber type optical waveguide 10.

As described above, in a wavelength converting optical device using a Cerenkov radiation system, by using a wave front converting element on which a diffraction grating is formed, an optical second harmonic wave emitted from a fiber type optical waveguide can be collimated or focused. In addition, by using a concentric diffraction grating, a wavelength converting optical device, including a wave front converting element which can be easily formed and allows easy positioning, can be realized. If the grating pitch of this concentric diffraction grating is set to satisfy equation (13) or (22), an optical second harmonic wave can be converted into a plane wave (collimated light) or spherical wave (converging or diverging light). Moreover, if the sectional shape of the concentric diffraction grating is formed into a sawtooth blazed pattern, a wavelength converting optical element, including a wave front converting element having a high refractive index, can be realized.

Note that the grating pitch of the wave front converting element shown in FIGS. 7 and 8 can be given by equation (13). However, if primary order diffracted light is used so as not to cause higher order diffracted light to appear, i.e., m=1 in equation (13), the grating pitch $\Lambda$ may become very small in value. For example, if $\lambda_2=0.42$ $\mu$m, $n_2=2.3$, and $\theta_c=15°$, $\Lambda=0.7$ $\mu$m. If a concentric diffraction grating is to be formed by holographic interference exposure, the above grating constant can be realized. However, if concentric diffraction gratings are formed by machining which enables mass production using a plastic replica, it is difficult to process a diffraction grating having a grating pitch of 1 $\mu$m or less.

As a means for solving the above problem, a technique of performing wave front conversion not only once, but two or more times, may be employed so as to increase the grating pitch of each wave front converting surface, thus facilitating formation of a wave front converting element. FIGS. 19 to 23 respectively show the seventh to eleventh embodiments based on this idea.

In the seventh embodiment shown in FIG. 19, a substrate 34 of a wave front converting element 31 has two wave front converting surfaces 31a and 31b. The surfaces 31a and 31b are respectively constituted by concentric diffraction gratings 32a and 32b, each having grooves formed at equal intervals. Each grating pitch $\Lambda$ is set to satisfy the following equation:

$$\Lambda = 2\lambda_2/(n_2 \sin \theta_c) \tag{25}$$

That is, the grating pitch of each of the diffraction gratings 32a and 32b is twice that of the grating of the wave front converting element shown in FIGS. 7 and 8 when $m=1$ in equation (13). Hence, such a diffraction grating can be easily obtained by machining.

In the seventh embodiment, two converting surfaces are formed on the same substrate. However, converting surfaces can be respectively formed on different substrates, as in the eighth embodiment shown in FIG. 20. More specifically, according to the eighth embodiment, a wave front converting element 31 includes two substrates 34a and 34b. Concentric diffraction gratings 32a and 32b, each having a grating pitch given by equation (25), are respectively formed on the substrates 34a and 34b. In this case, since the bottom surfaces of the substrates 34a and 34b, which have identical concentric diffraction gratings, need only be bonded to each other, formation of the wave front converting element is further facilitated.

In the seventh and eighth embodiments, two diffraction gratings have the same grating pitch. However, the grating pitches of the two diffraction gratings need not be equal to each other. If the grating pitches of the two diffraction gratings are respectively represented by $\Lambda_1$ and $\Lambda_2$, and $$1/\Lambda_1 + 1/\Lambda_2 = n_2 \sin \theta_c/\lambda_2 \tag{26}$$

is satisfied, output light can be converted into collimated light in the same manner as in the above-described embodiments. Equation (25) represents a specific case of equation (26) ($\Lambda_1 = \Lambda_2$).

In the embodiments shown in FIGS. 19 and 20, two wave front converting surfaces are constituted by concentric diffraction gratings. However, a wave front converting element 31 may be constituted by a combination of a concentric diffraction grating 32 and a conical prism 36, as shown in a ninth embodiment of FIG. 21. In this case, the converting element 31 can be reduced in size as compared with the ones shown in FIGS. 10A and 11A, and moreover positioning is facilitated.

FIG. 22 shows a tenth embodiment, in which a wave front converting element 31 is constituted by a combination of a concentric diffraction grating 32a having grooves formed at equal intervals and a Fresnel type concentric diffraction grating 32b. In this embodiment, output light can be converted into a spherical wave converging on one point. Similarly, in this case, the grating pitch can be increased as compared with the case wherein conversion is realized by only one wave front converting surface, thus formation of an element is facilitated. In addition, as shown in an eleventh embodiment of FIG. 23, a concentric diffraction grating 32 having grooves formed at equal intervals and located at the incidence side of a wave converting element 31 may be combined with a spherical or aspherical lens 38 located at the emerging side.

As described above, according to the seventh to eleventh embodiments, since the wave front converting element is constituted by two or more wave front converting surfaces, a wavelength converting optical device, including a wave front converting element which can be easily processed by machining, can be realized.

In the above-described embodiments, the optical waveguide having an axially symmetrical structure is exemplified as a fiber type optical waveguide. However, the present invention is not limited to this. That is, a three-dimensional optical waveguide such as a diffusion type optical waveguide, an embedded type optical waveguide, or a ridge stripe structure may be used.

FIGS. 24 to 26 show a twelfth embodiment of the present invention. In this embodiment, an optical waveguide 10 comprises a rectangular parallel-piped LiNbO$_3$ substrate 12 as a cladding portion, and a plate-like waveguide portion 11 bonded to a surface of the substrate 12. The optical waveguide 10 has input and output end faces 10b and 10a. These end faces extend perpendicular to the optical axis of incident light 15. A lens plate 31 as a wave front converting element is arranged to oppose the output end face 10a of the optical waveguide 10. The fundamental wave 15 is incident into the waveguide portion 11 through the input end face 10b, and a Cerenkov radiation beam (optical second harmonic wave) 16 propagating in the substrate 12 emerges from the end face 10a of the waveguide 10. Furthermore, the Cerenkov radiation beam 16 is converted into a collimated beam 17 by the wave front converting element 31. In this embodiment, an optical second harmonic wave as a Cerenkov radiation beam is radiated from the waveguide portion 11 into only the substrate 12 side.

In this case, if the refractive indices of the substrate 12 with respect to a wavelength $\lambda_1$ of the fundamental wave 15 and a wavelength $\lambda_2$ ($=\lambda_1/2$) of the optical second harmonic wave 16 are respectively represented by $n_1$ and $n_2$, a material for the substrate 12 is selected to satisfy $$n_1 < n_{EFF} < n_2 \tag{27}$$

where $n_{EFF}$ is the effective refractive index of the optical waveguide 10 with respect to the fundamental wave. Since LiNbO$_3$ has a large nonlinear optical constant $d_{33}$, a substrate orientation and propagation and polarization directions of the fundamental wave are selected so as to use the constant $d_{33}$. More specifically, if a z-cut substrate is used as the substrate 12, a guided mode of a fundamental wave is set to a TM mode propagating in y direction (or x direction). If an x-cut substrate (or y-cut substrate) is used, a guided mode of a fundamental wave is set to be a TE mode propagating in y direction (or x direction).

If the fundamental wave 15 having the wavelength $\lambda_1$ is incident on the input end face of the optical waveguide 10, the incident light is converted into an optical second harmonic wave having a wavelength of $\lambda_1/2$ by a nonlinear optical effect of the LiNbO$_3$, and propagates in the substrate 12 as the Cerenkov radiation beam 16 having an angle $\theta_c$ with respect to the waveguide portion 11. The following relationship is established between the angle $\theta_c$ and $n_2$:

$$n_2 \cos \theta_c = n_{EFF} \tag{28}$$

This Cerenkov radiation beam is refracted by the output end face 10a and is radiated in the air at an angle $\theta_0$. The following relationship is established between $\theta_0$ and $\theta_c$:

$$n_2 \sin \theta_c = \sin \theta_0 \tag{29}$$

The second harmonic wave radiated in the air is converted into a collimated beam 17 by the wave front converting element 31. This collimated beam 17 can be focused into a diffraction-limited spot by a conventional lens. In this case, the second harmonic wave radiated from the waveguide 10 having the above-described arrangement does not become a perfectly conical wave. This is because the refractive index of a nonlinear crystal generally varies depending on propagation and polarization directions. That is, the emerging angle of the second harmonic wave radiated in the LiNbO$_3$ substrate 12 varies depending on directions, and the wave dose not have axial symmetry. As described above, an output beam does not become an axially symmetrical beam because of the anisotropy of the substrate 12, and hence collimation and focusing of the output beam become difficult. For this reason, in this embodiment, as shown in FIGS. 25 and 26, the wave front converting element 31 comprises a rectangular substrate 34 having a diffraction grating 32 arranged to oppose the emerging end face of the waveguide 10. The diffraction grating 32 is constituted by part of an elliptic pattern such that equivalent radial grating pitches are changed in accordance with the divergence angle of the second harmonic wave. Especially, this elliptic pattern is formed such that its major axis coincides with the upper edge of the substrate 34. This diffraction grating 32 has grating pitches $\Lambda_1$ and $\Lambda_2$ in two orthogonal directions.

An operation principle of the above-described wave front converting element 31 will be described below. A refractive index ellipsoid shown in FIG. 27 will be considered first to obtain the refractive index of the substrate 12 with respect to a second harmonic wave. In this case, assume that the propagation direction of a fundamental wave of guided mode is x, and a vector $\vec{n_1}$ is given in the same direction as the polarization direction of the guided mode. A pointing vector $\vec{s}$ represents the propagation direction of the second harmonic wave. A vector, which has the same propagation direction as that of the second harmonic wave and whose absolute value represents the refractive index with respect to the second harmonic wave, is given as $\vec{n_2}$. If the angle defined by the vector $\vec{s}$ and the x axis is represented by $\theta$, and the angle defined by the projection of the vector $\vec{s}$ on a yz plane and the z axis is represented by $\Psi$, the vector $\vec{s}$ is represented by the following equation:

$$\vec{s} = (\cos \theta, \sin \theta \sin \Psi, \sin \theta \cos \Psi) \tag{30}$$

If $\vec{n_1}$ and $\vec{n_2}$ are:

$$\vec{n_1} = (0, 0, n_e) \tag{31}$$

$$\vec{n_2} = (x, y, z) \tag{32}$$

then, the respective vectors must satisfy the following relations:

$$(x/n_0)^2 + (y/n_0)^2 + (z/n_e)^2 = 1 \tag{33}$$

$$\vec{s} \cdot \vec{n_2} = 0 \tag{34}$$

$$\vec{s} \cdot (\vec{n_1} \times \vec{n_2}) = 0 \tag{35}$$

where $n_0$ and $n_e$ are respectively the refractive indices with respect to ordinary and extraordinary light waves at the wavelength of the second harmonic wave. The refractive index $n_2$ with respect to the second harmonic wave can be given by the following equation according to equations (30) to (35):

$$\begin{aligned} n_2^2 &= |\vec{n_2}|^2 \\ &= \frac{\sec^2 \theta}{\tan^2 \theta (\cos^2 \psi / n_0^2 + \sin^2 \psi / n_e^2) + 1/n_e^2} \end{aligned} \tag{36}$$

The value $\theta$ in the above equation corresponds to the Cerenkov radiation angle $\theta_c$ in the arrangement shown in FIG. 24. Since $n_2$ in equation (36) must satisfy equation (28), the value $\theta_c$ can be given by the following equation according to equations (28) and (36):

$$\tan^2 \theta_c = \frac{1/n_{EFF}^2 - 1/n_e^2}{\cos^2 \psi / n_0^2 + \sin^2 \psi / n_e^2} \tag{37}$$

That is, in the arrangement shown in FIG. 24, the Cerenkov radiation angle $\theta_c$ generally varies depending on an angle $\Psi$. The angle $\Psi$ corresponds to the angle with respect to a waveguide surface when the x-cut substrate and TE mode are used, or corresponds to its complementary angle when the z-cut substrate and TM mode are used. In accordance with dependency on $\Psi$ in equation (37), the angle $\theta_0$ of the second harmonic wave radiated from the output end face 10a of the waveguide 10 varies depending on $\Psi$. If Cerenkov radiation angles in the air within a plane including the z axis ($\Psi = 0$) and a plane perpendicular to the z axis ($\Psi = \pi/2$) are respectively represented by $\theta_{01}$ and $\theta_{02}$, the following equations can be established according to equations (29) and (37):

$$\sin \theta_{01} = n_0 (1 - n_{EFF}^2 / n_e^2)^{\frac{1}{2}} \tag{38}$$

$$\sin \theta_{02} = n_e (1 - n_{EFF}^2 / n_e^2)^{\frac{1}{2}} \tag{39}$$

When LiNbO$_3$ is used, $n_0$ and $n_e$ can be given by the following equations as functions of a wavelength $\lambda$ [$\mu$m] and a temperature T [K], respectively (H. V. Hobden et al.: Phys. Lett., Vol. 23, No. 3, pp. 243 -244 (1966)):

$$n_0^2 = 4.9130 - 0.00278\lambda^2 + \frac{0.1173 + 1.65 \times 10^{-8} T^2}{\lambda^2 - (0.212 + 2.7 \times 10^{-8} T^2)^2} \tag{40}$$

$$n_e^2 = 4.5567 - 0.00224\lambda^2 + 2.605 \times 10^{-7} T^2 +$$

$$\frac{0.0970 + 2.70 \times 10^{-8} T^2}{\lambda^2 - (0.201 + 5.4 \times 10^{-8} T^2)^2}$$

Figure 28:
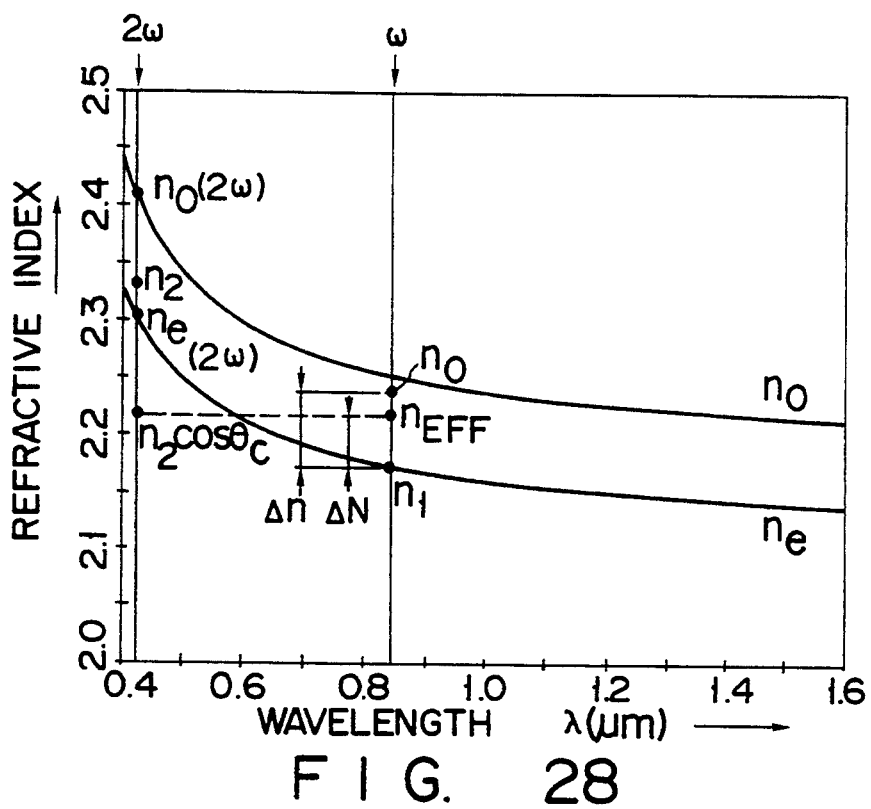
FIG. 28 is a graph showing a relationship between the refractive index and wavelength of $LiNbO_3$.
Figure 29:
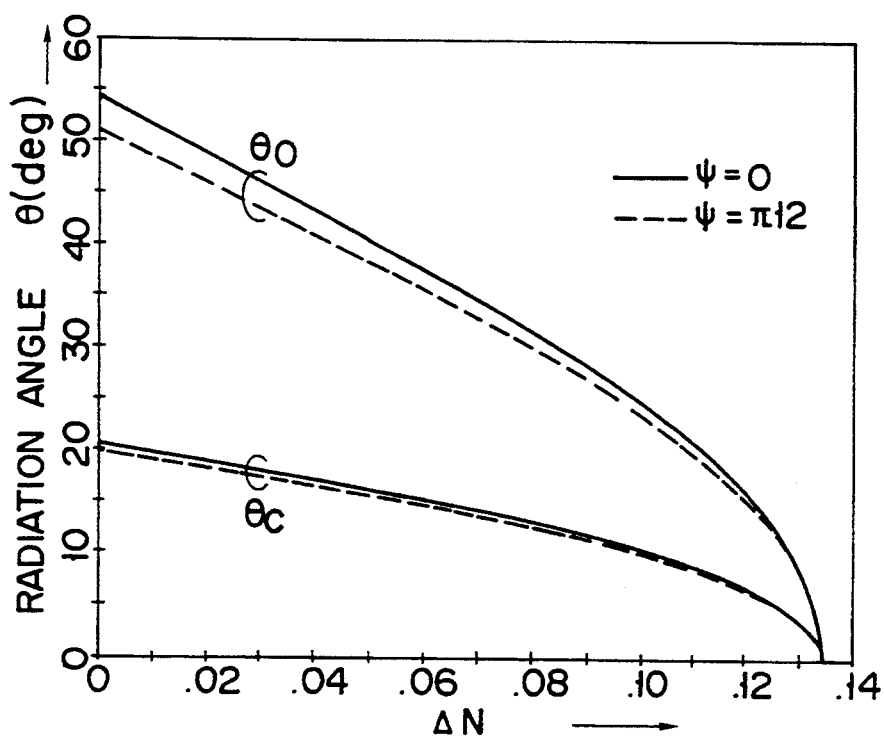
FIG. 29 is a graph showing a relationship between the Cerenkov radiation angle and $\Delta N$.

FIG. 28 shows wavelength dependence of the refractive index of LiNbO$_3$ at room temperature (25° C.). FIG. 28 shows relationships between $n_i$, $n_2$, and $n_{EFF}$ in equations (27) to (29) when the wavelengths of a fundamental wave and the second harmonic wave are respectively set to be 0.84 $\mu$m and 0.42 $\mu$m. FIG. 29 shows relationships between $\Delta N$ and radiation angles of second harmonic waves in the substrate and in the air, which are calculated by using the above equations. In this case, $\Delta N$ represents the difference between the effective refractive index and the substrate refractive index with respect to the guided mode, and is given as:

$$\Delta N = n_{EFF} - n_e(\omega) \qquad (42)$$

The difference $\Delta N$ and a difference $\Delta n = n_0 - n_1 (n_1 = n_e(\omega))$ between the refractive index of the waveguide portion and the substrate have the following relationship:

$$0 < \Delta N < \Delta n \qquad (43)$$

FIG. 29 shows two cases wherein $\Psi$ in equation (37) is 0 and $\pi/2$.

If $\theta_c$ is given by equation (37), the grating pitch of a diffraction grating used as a wave front converting element for collimating the corresponding light can be given by the following equation:

$$\Lambda = \frac{m\lambda_2 (\cos^2\psi/n_0^2 + \sin^2\psi/n_e^2)^{\frac{1}{2}}}{(1 - n_{EFF}^2/n_e^2)^{\frac{1}{2}}} \qquad (44)$$

As is apparent from the above equation, the grating pitch $\Lambda$ varies depending on the angle $\Psi$, in accordance with dependency of a Cerenkov radiation angle on $\Psi$. If the grating pitch $\Lambda$ is given as $\Lambda_1$ when $\Psi=0$, and is given as $\Lambda_2$ when $\Psi=\pi/2$, $\Lambda_1$ and $\Lambda_2$ are respectively represented as follows:

$$\Lambda_1 = m\lambda_2/n_0/(1 - n_{EFF}^2/n_e^2)^{\frac{1}{2}} \qquad (45)$$

$$\Lambda_2 = m\lambda_2/n_e/(1 - n_{EFF}^2/n_e^2)^{\frac{1}{2}} \qquad (46)$$

If $0 < \Psi < \pi/2$, the grating pitch $\Lambda$ takes an intermediate value of the values given by equations (45) and (46). As a result, the contour line representing a constant phase of the diffraction grating of the wave front converting element becomes an ellipse having a ratio of major and minor axes of $n_O$: $n_e$.

Figure 30:
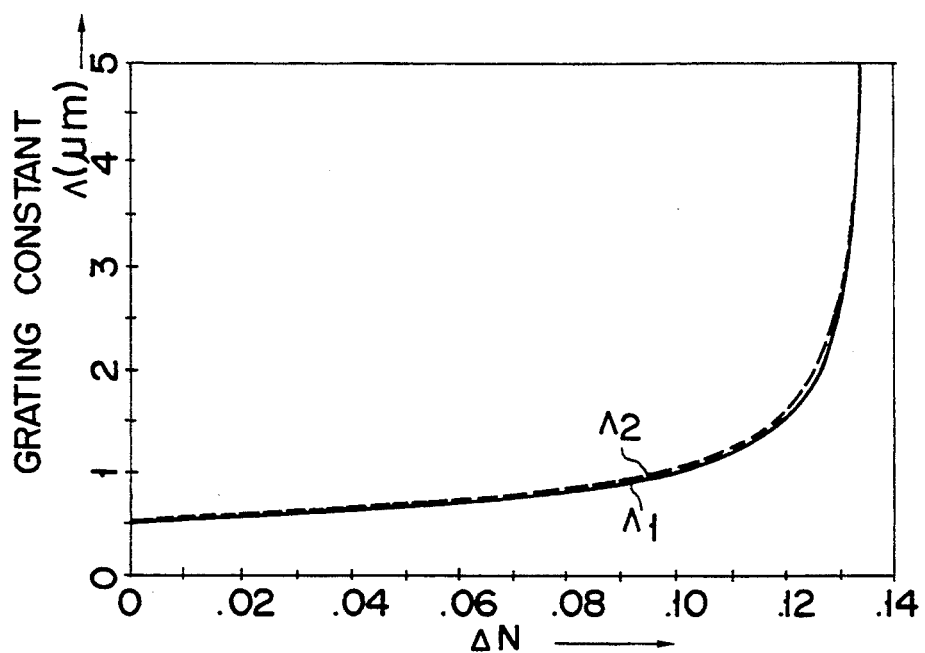
FIG. 30 is a graph showing a relationship between the grating pitch of a wave front converting element and $\Delta N$.

FIG. 30 shows a relationship between the grating pitches $\Lambda_1$ and $\Lambda_2$ and $\Delta N$ when primary order diffraction is used ($m=1$). A large grating pitch $\Lambda$ is preferable in terms of a diffraction grating process. As seen from FIG. 30, in order to obtain large grating pitch $\Lambda$, $\Delta N$ must be increased. According to FIG. 30, when $\Delta N=0.135$, $n_{EFF}(\omega)=n_e(\omega2)$, and $\theta_c=\theta_0=0$. In this case, $\Lambda=\infty$.

In formation of a waveguide by means of proton exchange, it is known that a refractive index difference with respect to extraordinary light can be set to be large, e.g., $\Delta n = 0.13$ is reported (Taniuchi et al.: Applied Physics, Vol. 56, No. 12, pp. 1637-1614 (1987)). Therefore, $\Delta N$ can be set at about 0.1. In this case, the grating pitch $\Lambda$ becomes about 1 $\mu$m, as shown in FIG. 30. Such a diffraction grating can be formed by, e.g., electron beam lithography (G. Hatakoshi et al.: Appl. Opt., Vol. 24, No. 24, pp. 4307-4311 (1985)).

The diffraction grating shown in FIGS. 25 and 26 has a sawtooth section, i.e., a blazed pattern so as to increase the diffraction efficiency. Such a diffraction grating can be formed by dose control during electron beam drawing.

According to the twelfth embodiment having the above-described arrangement, since the diffraction grating constituting the wave front converting element 31 has an elliptic pattern, the grating pitch of the diffraction grating varies in different radial directions. Hence, grating pitches can be set in accordance with the divergence angle of a second harmonic beam in different radial directions. In the optical waveguide type SGH system by means of the Cerenkov radiation system, by using the above-described converting element, an optical second harmonic wave having no axial symmetry can be collimated or focused. As a result, by using a semiconductor laser as an incident light source, a short wavelength light source for green or blue light, which cannot be obtained by a conventional semiconductor laser, can be realized.

In the twelfth embodiment, the wave front converting element serves to collimate output light. However, a wave front converting element for converting output light into a convergent or divergent spherical wave can be formed by changing the grating pattern. In this case, the grating pattern has an elliptic shape as in he twelfth embodiment. However, unlike the grating having grooves formed at equal intervals in each direction as shown in FIGS. 25 and 26, this grating has grooves formed at different intervals.

Figure 31:
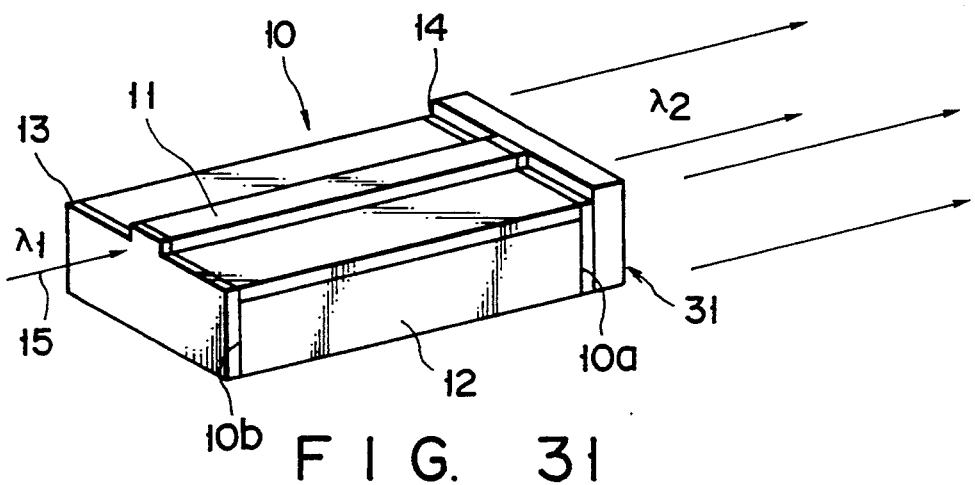
FIG. 31 is a perspective view showing a schematic arrangement of a wavelength converting optical device according to a thirteenth embodiment of the present invention.

In addition, as shown in FIG. 31, first and second reflecting films 14 and 13 each having the same structure as that of the reflecting film in the second embodiment may be respectively bonded to emerging and incidence end faces 10a and 10b of an optical waveguide 10 having the same structure as that of the above-described twelfth embodiment. In this case, a conversion efficiency from a guided mode into a second harmonic wave can be increased.

As described above, the diffraction grating of the twelfth embodiment can be formed by electron beam lithography. However, since the grating has an elliptic pattern, it is difficult to form the grating by other methods such as machining. In contrast to this, a diffraction grating having a concentric pattern can be relatively easily formed by using an NC lathe. However, if such a diffraction grating having a concentric pattern is used as a wave front converting element in the converting device having the arrangement of the twelfth embodiment, it is difficult to collimate or focus a second harmonic output beam which does not have axial symmetry.

An arrangement for using a wave front converting element having a diffraction grating with a concentric pattern will be described below.

Figure 32:
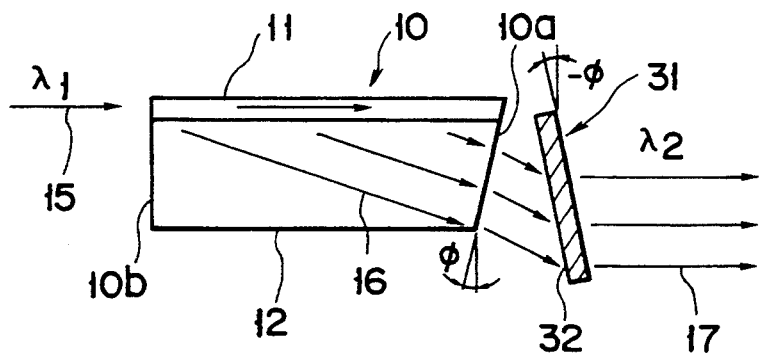
Figure 33:
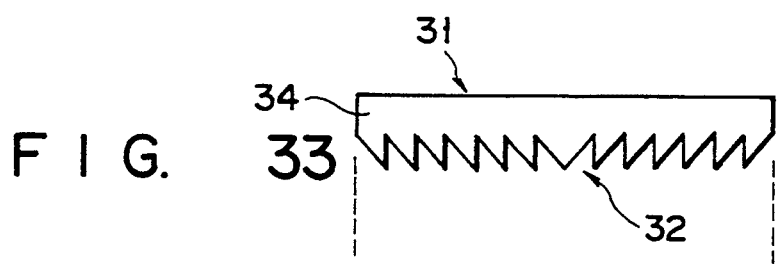
Figure 34:
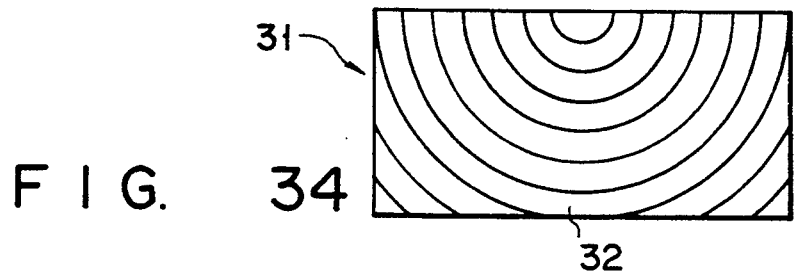

FIGS. 32 to 34 show a wavelength converting device according to a fourteenth embodiment of the present invention. This device employs a diffraction grating having a concentric pattern as a wave front converting element 31. More specifically, the device comprises an optical waveguide 10 having an LiNbO$_3$ substrate 12 and a waveguide 11, and the wave front converting element 31 arranged to oppose an output end face 10a of the waveguide 10. As shown in FIGS. 33 and 34, the converting element 31 has a rectangular substrate 34 and a diffraction grating 32 formed on its incidence surface. The diffraction grating 32 is constituted by part of a concentric pattern. More specifically, the diffraction grating 32 is formed such that the center of the concentric pattern is located at an upper edge of the substrate 34. In addition, as shown in FIG. 32, the output end face 10a of the waveguide 10 and the wave front converting element 31, i.e., the diffraction grating 32, are inclined at predetermined angles with respect to a plane perpendicular to the optical axis of incident light 15. By inclining the end face 10a and the element 31 in this manner, the anisotropy of a Cerenkov radiation angle from the waveguide 10 can be corrected. In this case, assume that the inclination angles of the concentric grating 32 and the end face 10a are respectively represented by $\phi$ and $\Phi$. If the substrate 12 of the waveguide 10 is a z-cut substrate, and a guided mode is a TM mode propagating in y direction, in order to collimate output light in this arrangement, the constant $\Lambda_2$ given by equation (46) is used as a grating pitch $\Lambda$ of the grating 32, and the inclination angles $\phi$ and $\Phi$ are set to satisfy the following equation:

$$\sin[\sin^{-1}\{n_{21}\sin(\theta_{c1}-\Phi)\}+\phi-\Phi]+\sin\Phi=\sin\theta_{02} \quad (47)$$

where $n_{21}$ and $\theta_{c1}$ correspond to $n_2$ and $\theta_c$, respectively, when $\Psi=0$. The above equation is modified by using equations (28), (29), and the like as follows:

$$\sqrt{1-(\sin\psi_{01}\cos\Phi-n_{EFF}\sin\Phi)^2}\sin(\Phi-\phi)+ \quad (48)$$
$$(\text{son}\theta_{01}\cos\Phi-n_{EFF}\sin\Phi)\cos(\Phi-\phi)+\sin\phi=\sin\theta_{02}$$

where $\theta_{01}$ and $\theta_{02}$ have the same meanings as those in equations (38) and (39). When an x-cut waveguide and a TE mode propagating in y direction are used, the pitch $\Lambda_1$ given by equation (45) is used as the grating pitch $\Lambda$, and $\theta_{01}$ and $\theta_{02}$ are exchanged in the above equation.

According to the fourteenth embodiment having the above-described arrangement, since the output end face 10a of the optical waveguide 10 and the diffraction grating 32 of the wave front converting element 31 are inclined at the predetermined angles with respect to the plane perpendicular to the optical axis of the incidence light 15, the grating pitches of the diffraction grating can be set in accordance with the divergence angle of the second harmonic beam in different radial directions even by using the diffraction grating having a concentric pattern. Therefore, collimation or focusing of the second harmonic wave which does not have axial symmetry can be performed in the same manner as with the case wherein a diffraction grating having an elliptic pattern is used. In addition, since a diffraction grating having a concentric pattern can be used, a wave front converting element can be easily manufactured.

Figure 35:
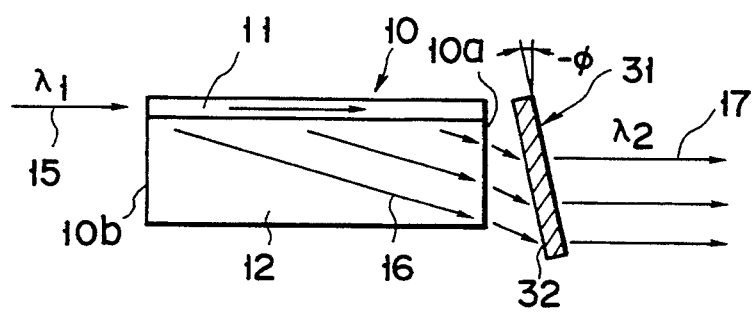
Figure 36:
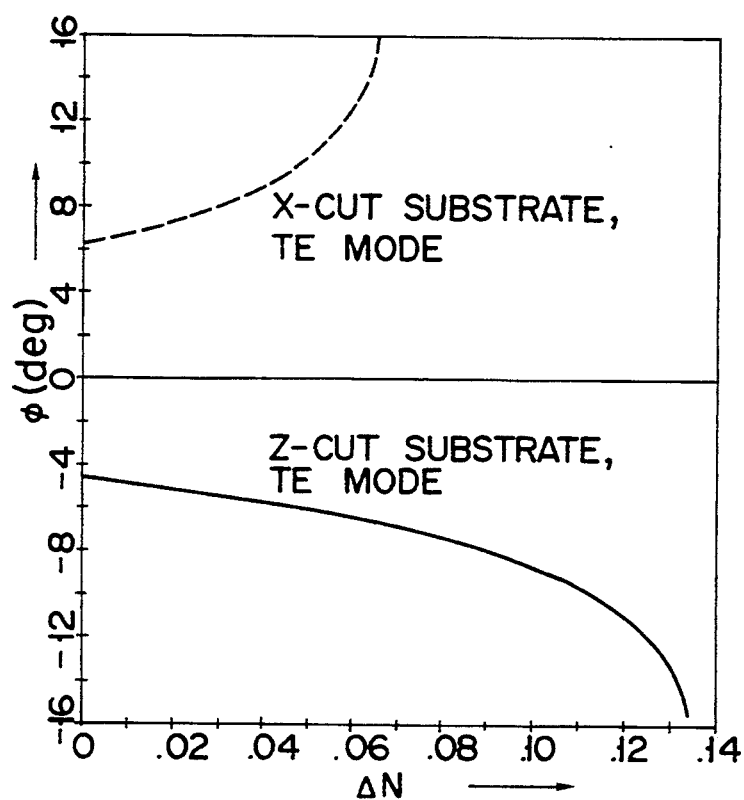

In the fourteenth embodiment, both the wave front converting element and the output end face of the waveguide are inclined. However, the anisotropy of a Cerenkov radiation angle can be corrected in the same manner even by inclining only one of them. According to a fifteenth embodiment of the present invention shown in FIG. 35, an output end face 10a of an optical waveguide 10 is arranged to be perpendicular to the optical axis of incident light 15, and a wave front converting element 31 having a diffraction grating 32 with a concentric pattern is inclined with respect to the end face 10a, thereby correcting a Cerenkov radiation angle. In this case, in order to determine the inclination angle of the converting element 31, $\Phi=0$ may be set in equation (47). That is, an inclination angle $\phi$ of the wave front converting element 31 is given by the following equation (a z-cut substrate, and a TM mode propagating in y direction are used):

$$\tan\phi=\frac{\sin\theta_{01}(1-\cos\theta_{01})-\sin\theta_{02}\sqrt{A}}{\sin^2\theta_{02}-(1-\cos\theta_{01})^2} \quad (49)$$

where $A=(1-\cos\theta_{01})^2+\sin^2\theta_{01}-\sin^2\theta_{02}$. Similarly, when an x-cut substrate and a TE mode are used, the above equation can be replaced by the following equation:

$$\tan\phi=\frac{\sin\theta_{02}(1-\cos\theta_{02})-\sin\theta_{01}\sqrt{B}}{\sin^2\theta_{01}-(1-\cos\theta_{02})^2} \quad (50)$$

where $B=(1-\cos\theta_{02})^2+\sin^2\theta_{02}-\sin^2\theta_{01}$. The sign of $\phi$ varies depending on whether the z-cut substrate or the x-cut substrate is used. More specifically, in equation (49), $\phi<0$, wherein in equation (24), $\phi>0$. FIG. 36 shows a relationship between $\Delta N$ and $\phi$ defined by equation (42).

Figure 37:
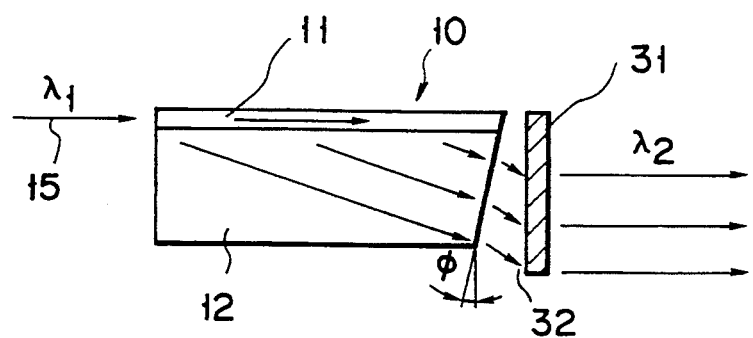

According to a sixteenth embodiment shown in FIG. 37, only an output end face 10a of a waveguide 10 is inclined at a predetermined angle with respect to the plane perpendicular to the optical axis of incident light 15, and a wave front converting element 31 is arranged to be perpendicular to the optical axis. By substituting $\phi=0$ in equation (48), an inclination angle $\Phi$ of the end face 10a is obtained as follows (a z-cut substrate and a TM mode are used):

$$\tan\Phi=(\sin\theta_{01}-\sin\theta_{02})/(n_{EFF}-\cos\theta_{02}) \quad (51)$$

Similarly, if an x-cut substrate and a TE mode are used, $$\tan\Phi=(\sin\theta_{02}-\sin\theta_{01})/(n_{EFF}-\cos\theta_{01}) \quad (52)$$

Figure 38:
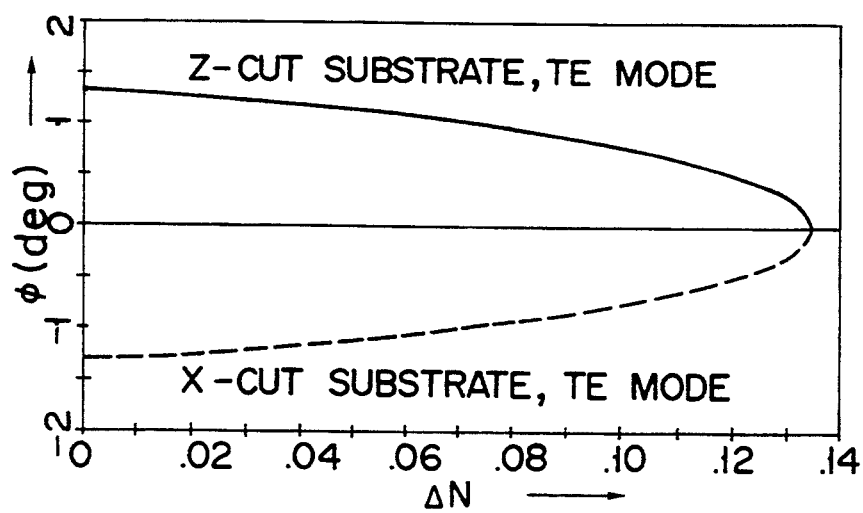

Similar to the case wherein the wave front converting element is inclined, the sign of $\Phi$ varies depending on whether the z or x-cut substrate is used. FIG. 38 shows a relationship between $\Delta N$ and $\Phi$. As is apparent from a comparison between FIGS. 36 and 38, an anisotropy correcting effect of a Cerenkov radiation angle is increased with $\Phi$ than with $\phi$. That is, a smaller inclination angle is required when the output end face of the optical waveguide is inclined than when the wave front converting element is inclined. As $\Delta N$ is increased, this tendency becomes more conspicuous. When $\Delta N=0.135$, i.e., $n_{EFF}(\omega)=n_c(2\omega)$, correction by the value $\phi$ is required in spite of the fact that correction by the value $\Phi$ is zero. This may seem contradictory. However, this is because $\theta_{01}=\theta_{02}=0$ at this time, so that the grating constant becomes infinity, and the value $\phi$ becomes indefinite.

Figure 39:
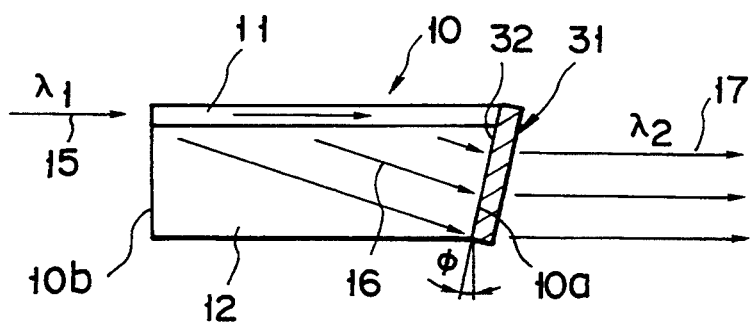
Figure 40:
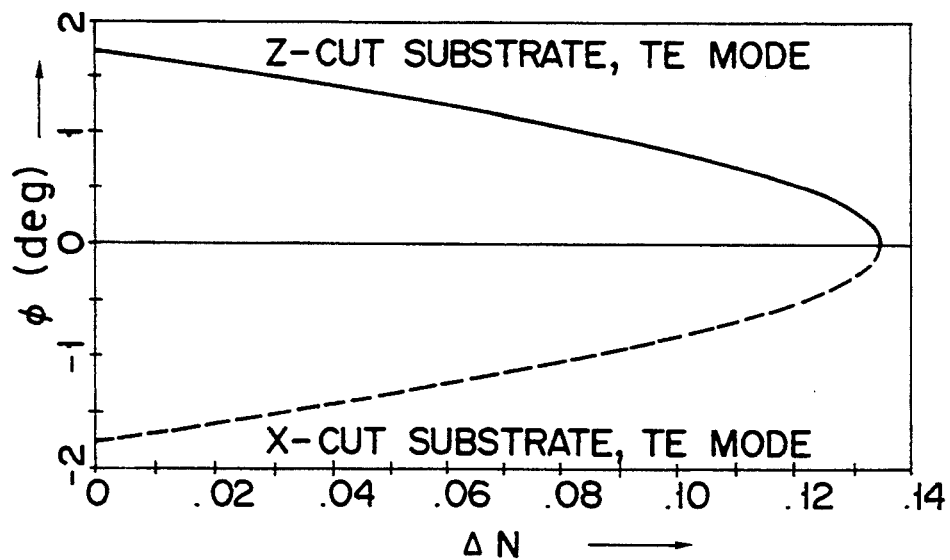

FIG. 39 shows a seventeenth embodiment of the present invention, in which both the output end face 10a of a waveguide 10 and a wave front converting element 31 are inclined in the same direction with respect to the plane perpendicular to the optical axis of incident light 15. According to this arrangement, since the element 31 can be bonded to the end face 10a, positioning of these components can be easily performed. The inclination angle at this time may be set as $\Phi=\phi$ in equation (48). That is, when a z-cut substrate and a TM mode are used, an inclination angle $\Phi$ is given by the following equation:

$$\tan\Phi = \frac{\sin\theta_{01}(n_{EFF} - 1) - \sin\theta_{02}\sqrt{C}}{(n_{EFF} - 1)^2 - \sin^2\theta_{02}} \quad (53)$$

where $C = (n_{EFF}-1)^2 + \sin^2\theta_{01} - \sin^2\theta_{02}$. Similarly, when an x-cut substrate and a TE mode are used, the above equation can be replaced by the following equation:

$$\tan\Phi = \frac{\sin\theta_{02}(n_{EFF} - 1) - \sin\theta_{01}\sqrt{D}}{(n_{EFF} - 1)^2 - \sin^2\theta_{01}} \quad (54)$$

where $D = (n_{EFF}-1)^2 + \sin^2\theta_{02} - \sin^2\theta_{01}$. FIG. 40 shows a relationship between $\Delta N$ and $\Phi$ given by equations (53) and (54).

In the fifteenth to seventeenth embodiments having the above-described arrangements, a second harmonic wave emerging from each optical waveguide 10 can be collimated or focused by using a wave front converting element having a diffraction grating with a concentric pattern which can be relatively easily formed.

Figure 41:
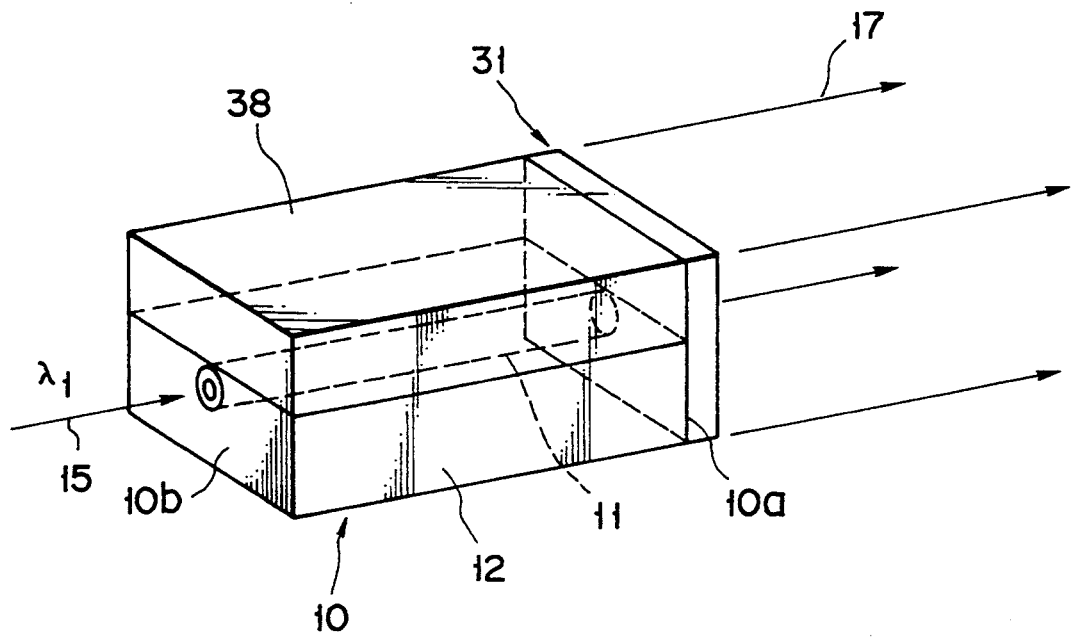
FIG. 41 is a perspective view showing a schematic arrangement of a wavelength converting optical device according to an eighteenth embodiment of the present invention.

FIG. 41 is a perspective view showing a schematic arrangement of an eighteenth embodiment of present invention. In this embodiment, an embedded type three-dimensional waveguide is used as a fiber type optical waveguide, and a cover made of the same material as that of a substrate is fixed to the upper portion of the optical waveguide so as to further improve axial symmetry. More specifically, the optical waveguide 10 comprises a rectangular parallel-piped LiNbO$_3$ substrate 12, a cylindrical waveguide portion 11 embedded in the substrate, and a rectangular parallel-piped LiNbO$_3$ cover 38 fixed to the upper surface of the substrate. A wave front converting element 31 is arranged on an output end face 10a of the waveguide 10. In this case, a diffraction grating having a concentric pattern or an elliptic pattern may be used as the element 31.

Note that the embedded type three-dimensional optical waveguide in this embodiment can be formed by, e.g., a combination of Ti diffusion and MgO additional diffusion (1986 Spring Applied Physics Meeting, 3p-L-11).

The present invention is not limited to the above-described embodiments, various changes and modifications can be made within the spirit and scope of the invention.

For example, an inorganic nonlinear material such as LiTaO$_3$, KNbO$_3$, LiIO$_3$, or KTP or an organic nonlinear material such as MNA or DAN may be used as a nonlinear material used for a cladding portion, a substrate, and the like of an optical waveguide in place of LiNbO$_3$. In addition, the arrangement of an optical waveguide is not limited to those in the above-described embodiments. For example, a waveguide portion may be formed by diffusing an impurity in a surface portion of a substrate formed of a nonlinear material. Moreover, it is only required that at least one of a waveguide portion and a clad portion (substrate) of an optical waveguide is formed of a nonlinear optical material. Therefore, a waveguide portion need not be always formed of a nonlinear optical material, and only cladding portion may be formed of a nonlinear optical material. Alternatively, both waveguide and cladding portions may be formed of a nonlinear optical material.

What is claimed is:

1. A wavelength converting optical device comprising:
    optical waveguide means, including a waveguide portion and a cladding portion, at least one of which is formed of a nonlinear optical material, and input and output end faces, for converting a fundamental wave, incident on said waveguide portion from the input end face, into an optical second harmonic wave by Cerenkov radiation, radiating the optical second harmonic wave into said cladding portion, and outputting the radiated optical second harmonic wave from the output end face, said waveguide and cladding portions respectively having refractive indices for converting the incident fundamental wave and the second harmonic wave into a guided mode and a Cerenkov radiation beam, respectively; and
    a reflecting film provided on said output end face of said optical waveguide means and having a high reflectivity with respect to the fundamental wave of the guided mode and a low reflectivity with respect to the optical second harmonic wave.

2. A device according to claim 1, wherein said reflecting film has a reflectivity of not less than 95% with respect to the fundamental wave of the guided mode and a reflectivity of not more than 5% with respect to the second harmonic wave.

3. A device according to claim 2, wherein said reflecting film has a reflectivity of not less than 99% with respect to the fundamental wave of the guided mode and a reflectivity of not more than 2% with respect to the second harmonic wave.

4. A device according to claim 1, which further comprises a second reflecting film, provided on said input end face of said optical waveguide means and having a predetermined reflectivity with respect to the fundamental wave of the guided mode, for reflecting the fundamental wave of the guided mode, which is reflected by said first reflecting film toward said input end face, toward said output end face.

5. A device according to claim 4, wherein said second reflecting film has a reflectivity within the range of 50 to 95% with respect to the fundamental wave of the guided mode.

6. A device according to claim 4, wherein said input and output end faces extend to be perpendicular to an optical axis of the fundamental wave incident on said input end face.

7. A device according to claim 1, wherein said waveguide means comprises a cylindrical waveguide portion and a hollow cylindrical cladding portion fixed to an outer surface of said waveguide portion and extending coaxially with said waveguide portion.

8. A device according to claim 1, which further comprises a second reflecting film, provided on said input end face of said optical waveguide means and having a high reflectivity with respect to the second harmonic wave, for reflecting the second harmonic wave, which is radiated toward said input end face, toward said output end face.

9. A device according to claim 8, wherein said second reflecting film has a predetermined reflectivity with respect to the fundamental wave of the guided mode so as to reflect the fundamental wave of the guided mode, which is reflected by said first reflecting film toward said input end face, toward said output end face.

10. A device according to claim 9, wherein said second reflecting film has a reflectivity of about 100% with respect to the second harmonic wave and a reflectivity within the range of 50 to 95% with respect to the fundamental wave of the guided mode.

11. A device according to claim 1, which further comprises wave front converting means, including a diffraction grating arranged to oppose said reflecting film, for converting the second harmonic wave emerging from said output end face of said optical waveguide means into one of plane, spherical and conical waves.

12. A wavelength converting optical device comprising:
(a) optical waveguide means, including a waveguide portion and a cladding portion, at least one of which is formed of a nonlinear optical material, and input and output end faces, for converting a fundamental wave, incident on said waveguide portion from said input end face, into an optical second harmonic wave by Cerenkov radiation, radiating the optical second harmonic wave into said cladding portion, and outputting the radiated optical second harmonic wave from said output end face, said waveguide and cladding portions respectively having refractive indices for converting the incident fundamental wave and the second harmonic wave into a guided mode and a Cerenkov radiation beam, respectively; and
(b) wave front converting means, having a diffraction grating arranged to oppose said output end face, for converting the second harmonic wave, emerging from said output end face of said optical waveguide means, into one of plane, spherical, and conical waves,
(c) wherein said diffraction grating is a diffraction grating of a blazed pattern having a sawtooth sectional shape.

13. A wavelength converting optical device comprising:
(a) optical waveguide means, including a waveguide portion and a cladding portion, at least one of which is formed of a nonlinear optical material, and input and output end faces, for converting a fundamental wave, incident on said waveguide portion from said input end face, into an optical second harmonic wave by Cerenkov radiation, radiating the optical second harmonic wave into said cladding portion, and outputting the radiated optical second harmonic wave from said output end face, said waveguide and cladding portions respectively having refractive indices for converting the incident fundamental wave and the second harmonic wave into a guided mode and a Cerenkov radiation beam, respectively; and
(b) wave front converting means, having a diffraction grating arranged to oppose said output end face, for converting the second harmonic wave, emerging from said output end face of said optical waveguide means, into one of plane, spherical, and conical waves,
wherein:
(c) said wave front converting means comprises a substrate having first and second converting surfaces opposing each other, said diffraction grating being formed on said first converting surface, and
(d) said wave front converting means comprises a second diffraction grating having a concentric pattern formed on said second converting surface of said substrate.

14. A wavelength converting optical device comprising:
(a) optical waveguide means, including a waveguide portion and a cladding portion, at least one of which is formed of a nonlinear optical material, and input and output end faces, for converting a fundamental wave, incident on said waveguide portion from said input end face, into an optical second harmonic wave by Cerenkov radiation, radiating the optical second harmonic wave into said cladding portion, and outputting the radiated optical second harmonic wave from said output end face, said waveguide and cladding portions respectively having refractive indices for converting the incident fundamental wave and the second harmonic wave into a guided mode and a Cerenkov radiation beam, respectively; and
(b) wave front converting means, having a diffraction grating arranged to oppose said output end face, for converting the second harmonic wave, emerging from said output end face of said optical waveguide means, into one of plane, spherical, and conical waves,
wherein:
(c) said wave front converting means comprises a substrate having first and second converting surfaces opposing each other, said diffraction grating being formed on said first converting surface, and
(d) said second converting surface of said substrate has a conical shape or an aspherical shape.

15. A wavelength converting optical device comprising:
(a) optical waveguide means, including a waveguide portion and a cladding portion, at least one of which is formed of a nonlinear optical material, and input and output end faces, for converting a fundamental wave, incident on said waveguide portion from said input end face, into an optical second harmonic wave by Cerenkov radiation, radiating the optical second harmonic wave into said cladding portion, and outputting the radiated optical second harmonic wave from said output end face, said waveguide and cladding portions respectively having refractive indices for converting the incident fundamental wave and the second harmonic wave into a guided mode and a Cerenkov radiation beam, respectively; and
(b) wave front converting means, having a diffraction grating arranged to oppose said output end face, for converting the second harmonic wave, emerging from said output end face of said optical waveguide means, into one of plane, spherical, and conical waves,
wherein:
(c) said wave front converting means comprises a substrate having first and second converting surfaces opposing each other, said diffraction grating being formed on said first converting surface, and
(d) said substrate is arranged such that said second converting surface is in contact with said output end face of said optical waveguide means.

16. A wavelength converting optical device comprising:
(a) optical waveguide means, including a waveguide portion and a cladding portion, at least one of which is formed of a nonlinear optical material, and input and output end faces, for converting a fundamental wave, incident on said waveguide portion from said input end face, into an optical second harmonic wave by Cerenkov radiation, radiating the optical second harmonic wave into said cladding portion, and outputting the radiated optical second harmonic wave from said output end face, said waveguide and cladding portions respectively having refractive indices for converting the incident fundamental wave and the second harmonic wave into a guided mode and a Cerenkov radiation beam, respectively; and (b) wave front converting means, having a diffraction grating arranged to oppose said output end face, for converting the second harmonic wave, emerging from said output end face of said optical waveguide means, into one of plane, spherical, and conical waves, wherein:

(c) said waveguide means comprises a substrate constituting a substantially rectangular parallelepipedal cladding portion and (d) said waveguide portion is fixed to one surface of said substrate.

17. A device according to claim 16, wherein said diffraction grating is constituted by part of an elliptic pattern which includes the center of the elliptic pattern, and is arranged such that the center of the elliptic pattern is located on an optical axis of the fundamental wave incident on said waveguide means.

18. A device according to claim 17, wherein major and minor axes of the elliptic pattern are set to have a ratio of $n_0$: $n_e$, assuming that refractive indices of said cladding portion with respect to ordinary and extraordinary light-wave at a wavelength of the second harmonic wave are respectively represented by $n_0$ and $n_e$.

19. A device according to claim 16, wherein said diffraction grating is constituted by that part of a concentric pattern which includes the center of the concentric pattern, and is arranged such that the center of the concentric pattern is located on an optical axis of the fundamental wave incident on said waveguide means, at least one of said output end face of said waveguide means and said diffraction grating being inclined at a predetermined angle with respect to a plane perpendicular to the optical axis of the fundamental wave.

20. A device according to claim 19, wherein said output end face of said waveguide means is located parallel to said plane, and said diffraction grating is inclined at a predetermined angle with respect to said plane.

21. A device according to claim 19, wherein said output end face of said waveguide means is inclined at a predetermined angle with respect to said plane, and said diffraction grating is located parallel to the plane.

22. A device according to claim 19, wherein said output end face of said waveguide means is inclined at a predetermined angle with respect to said plane, and said diffraction grating is arranged in contact with said output end face.

23. A wavelength converting optical device comprising:

(a) optical waveguide means, including a waveguide portion and a cladding portion, at least one of which is formed of a nonlinear optical material, and input and output end faces, for converting a fundamental wave, incident on said waveguide portion from said input end face, into an optical second harmonic wave by Cerenkov radiation, radiating the optical second harmonic wave into said cladding portion, and outputting the radiated optical second harmonic wave from said output end face, said waveguide and cladding portions respectively having refractive indices for converting the incident fundamental wave and the second harmonic wave into a guided mode and a Cerenkov radiation beam, respectively; and (b) wave front converting means, having a diffraction grating arranged to oppose said output end face, for converting the second harmonic wave, emerging from said output end face of said optical waveguide means, into a conical wave.

* * * * *